(12) United States Patent
Lee et al.

(10) Patent No.: US 11,523,363 B2
(45) Date of Patent: Dec. 6, 2022

(54) ELECTRONIC DEVICE AND METHOD FOR REGISTERING OWNERSHIP

(71) Applicant: Samsung Electronics Co., Ltd., Gyeonggi-do (KR)

(72) Inventors: Sunghee Lee, Gyeonggi-do (KR); Junhak Lim, Gyeonggi-do (KR); Taehun Lim, Gyeonggi-do (KR)

(73) Assignee: Samsung Electronics CO., LTD., Suwon-si (KR)

( * ) Notice: Subject to any disclaimer, the term of this patent is extended or adjusted under 35 U.S.C. 154(b) by 77 days.

(21) Appl. No.: 17/258,507

(22) PCT Filed: Jul. 11, 2019

(86) PCT No.: PCT/KR2019/008587
§ 371 (c)(1),
(2) Date: Jan. 7, 2021

(87) PCT Pub. No.: WO2020/013639
PCT Pub. Date: Jan. 16, 2020

(65) Prior Publication Data
US 2021/0297978 A1    Sep. 23, 2021

(30) Foreign Application Priority Data
Jul. 13, 2018 (KR) .......................... 10-2018-0081848

(51) Int. Cl.
*H04W 60/00*     (2009.01)
(52) U.S. Cl.
CPC ................................. *H04W 60/00* (2013.01)
(58) Field of Classification Search
CPC ..... H04W 60/00; G06Q 30/018; G06Q 10/20; G06F 21/30; G06F 21/88
See application file for complete search history.

(56) References Cited

U.S. PATENT DOCUMENTS

| 2005/0158048 | A1* | 7/2005 | Sung | ..................... H04J 3/1694 398/66 |
| 2006/0133356 | A1* | 6/2006 | Suzukawa | ............... H04L 67/14 370/352 |

(Continued)

FOREIGN PATENT DOCUMENTS

| KR | 10-2006-0084717 A | 7/2006 |
| KR | 10-2014-0044215 A | 4/2014 |

(Continued)

*Primary Examiner* — Marisol Figueroa
(74) *Attorney, Agent, or Firm* — Cha & Reiter, LLC

(57) ABSTRACT

An electronic device comprises: at least one communication circuit configured to provide communication with a first external electronic device or a second external electronic device; at least one processor operatively connected to the at least one communication circuit; and a memory including device registration request information and operatively connected to the at least one processor, wherein the memory may store instructions configured to cause, when executed, at least one processor to: transmit, to the first external electronic device, a device registration request including at least device registration request information for registering the electronic device to the second external electronic device when a first communication is connected with the first external electronic device through the at least one communication circuit; receive a response to the device registration request from the first external electronic device; receive, from the second external electronic device, device registration update information that is updated on the basis of the registration request of the electronic device, based on the response, when a second communication is connected with the second external electronic device through the at least one communication circuit; and store the received device registration update information in the memory.

14 Claims, 12 Drawing Sheets

(56) References Cited

U.S. PATENT DOCUMENTS

| | | | |
|---|---|---|---|
| 2006/0159268 A1 | 7/2006 | Jung et al. | |
| 2013/0208626 A1* | 8/2013 | Lee | H04W 4/203 370/255 |
| 2015/0222621 A1 | 8/2015 | Baum et al. | |
| 2016/0065557 A1 | 3/2016 | Hwang et al. | |
| 2017/0339159 A1* | 11/2017 | Gomi | H04L 63/20 |
| 2018/0198763 A1 | 7/2018 | Bryson et al. | |
| 2020/0045546 A1* | 2/2020 | Zhou | H04W 52/0206 |

FOREIGN PATENT DOCUMENTS

| | | |
|---|---|---|
| KR | 10-2016-0026582 A | 3/2016 |
| KR | 10-2016-0149751 A | 12/2016 |

* cited by examiner

ELECTRONIC DEVICE AND METHOD FOR REGISTERING OWNERSHIP

CROSS-REFERENCE TO RELATED APPLICATION(S)

This application is a National Phase Entry of PCT International Application No. PCT/KR2019/008587, which was filed on Jul. 11, 2019, and claims priority to Korean Patent Application No. 10-2018-0081848, which was filed on Jul. 13, 2018, the content of each of which are incorporated herein by reference.

TECHNICAL FIELD

Various embodiments relate to an electronic device and a method for registering ownership.

BACKGROUND ART

With the development of wireless communication technology, various electronic devices may perform functions through interworking with a remote server.

For example, Internet of things (IoT) devices (e.g., a washing machine, a refrigerator, an air conditioner, a heating apparatus, a robotic vacuum cleaner, a TV, an unmanned camera, a meter, or a router), which are increasingly used in recent years, can be remotely controlled, and users can control such devices via indirect control through a remote server anytime and anywhere regardless of physical location.

In order to control an IoT device through a remote server, a user first needs to register ownership of the IoT device in the remote server.

Generally, an IoT device manufacturer may provide a mobile application or a homepage for registration of an IoT device, and a user who purchases the IoT device can register ownership of the IoT device in a remote server through the mobile application or the homepage to remotely control various functions of the IoT device.

DETAILED DESCRIPTION OF THE INVENTION

Technical Problem

For a user to register ownership of an IoT device, a process for authenticating the user using user identification information about the user and a process for transmitting device identification information (e.g., a serial number or hash code) about the IoT device to a remote server, identifying the device identification information, and registering the IoT device are required. Generally, as a method for the user to transmit the device identification information to the remote server, direct input by the user or automatic input using short-range wireless communication may be used. However, the device identification information may be exposed to users other than the owner or may be vulnerable to security due to hacking, thus causing a problem that a different user may register ownership of the device.

When the IoT device is transferred to a different user, a process of transferring the ownership is required. Generally, according to a method for transferring the ownership of the IoT device, a transferee owner can register the IoT device after an original owner deregisters the ownership of the device. However, when the original owner does not deregister the ownership, the transferee owner may have an inconvenience of needing to prove that the transferee owner is the actual owner of the device through a manufacturer's customer satisfaction (CS) center and to request deregistration of the ownership by the previous owner.

Various embodiments may provide a method for a user to conveniently and safely register ownership of an electronic device by safely sharing updated information for registering the ownership of the electronic device in a remote server between the electronic device and the remote server Various embodiments may provide a method for conveniently and safely reregistering ownership of an electronic device when the electronic device is transferred to a different user but a previous user does not deregister the electronic device.

Various embodiments may provide a method for registering ownership of an electronic device even in an environment where a communication network connection between the electronic device and a remote server is not provided.

Technical Solution

According to various embodiments, an electronic device may include: at least one communication circuit configured to provide communication with a first external electronic device or a second external electronic device; at least one processor operatively connected to the at least one communication circuit; and a memory including device registration request information and operatively connected to the at least one processor, wherein the memory may store instructions configured to cause, when executed, at least one processor to: transmit, to the first external electronic device, a device registration request including at least device registration request information for registering the electronic device to the second external electronic device when a first communication is connected with the first external electronic device through the at least one communication circuit; receive a response to the device registration request from the first external electronic device; receive, from the second external electronic device, device registration update information that is updated on the basis of the registration request of the electronic device, based on the response, when a second communication is connected with the second external electronic device through the at least one communication circuit; and store the received device registration update information in the memory.

According to various embodiments, an electronic device may include: at least one communication circuit configured to provide communication with a first external electronic device or a second external electronic device; at least one processor configured to be operatively connected to the at least one communication circuit; and a memory configured to be operatively connected to the at least one processor, wherein the memory stores instructions configured, when executed, to cause the at least one processor to: receive a device registration request including at least device identification information for identifying the second external electronic device and device registration request information for device registration of the second external electronic device from the first external electronic device through the at least one communication circuit; identify device registration authentication information for authenticating device registration of the second external electronic device stored in the memory based on the device registration request; perform device registration of the second external electronic device based on the identified device registration authentication information and the device registration request information included in the device registration request; transmit a result of the device registration of the second external electronic device to the first external electronic device; and transmit device registration update information updated based on the registration request of the second external electronic device to the second external electronic device through the at least one communication circuit when the second external electronic device is connected.

According to various embodiments, recording medium non-transitorily storing instructions which are configured, when executed by at least one circuit, to cause the at least one circuit to perform at least one operation, wherein the at least one operation may include: an operation of transmitting a device registration request including at least a device registration request information for registering the electronic device in a second external electronic device to a first external electronic device when first communication with the first external electronic device is established; an operation of receiving a response to the device registration request from the first external electronic device; an operation of receiving device registration update information updated based on the registration request of the electronic device from the second external electronic device based on the response when second communication with the second external electronic device is established; and an operation of storing the received device registration update information in a memory.

Advantageous Effects

Various embodiments may provide an electronic device and a method for registering ownership which enables updated information for registering ownership of the electronic device in a remote server to be safely shared between the electronic device and the remote server, thereby enabling a user to conveniently and safely register the ownership of the electronic device.

According to various embodiments, it is possible to conveniently and safely reregister ownership of an electronic device when the electronic device is transferred to a different user but a previous user does not deregister the electronic device.

According to various embodiments, it is possible to register ownership of an electronic device even in an environment where a communication network connection between the electronic device and a remote server is not provided.

MODE FOR CARRYING OUT THE INVENTION

Figure 1:
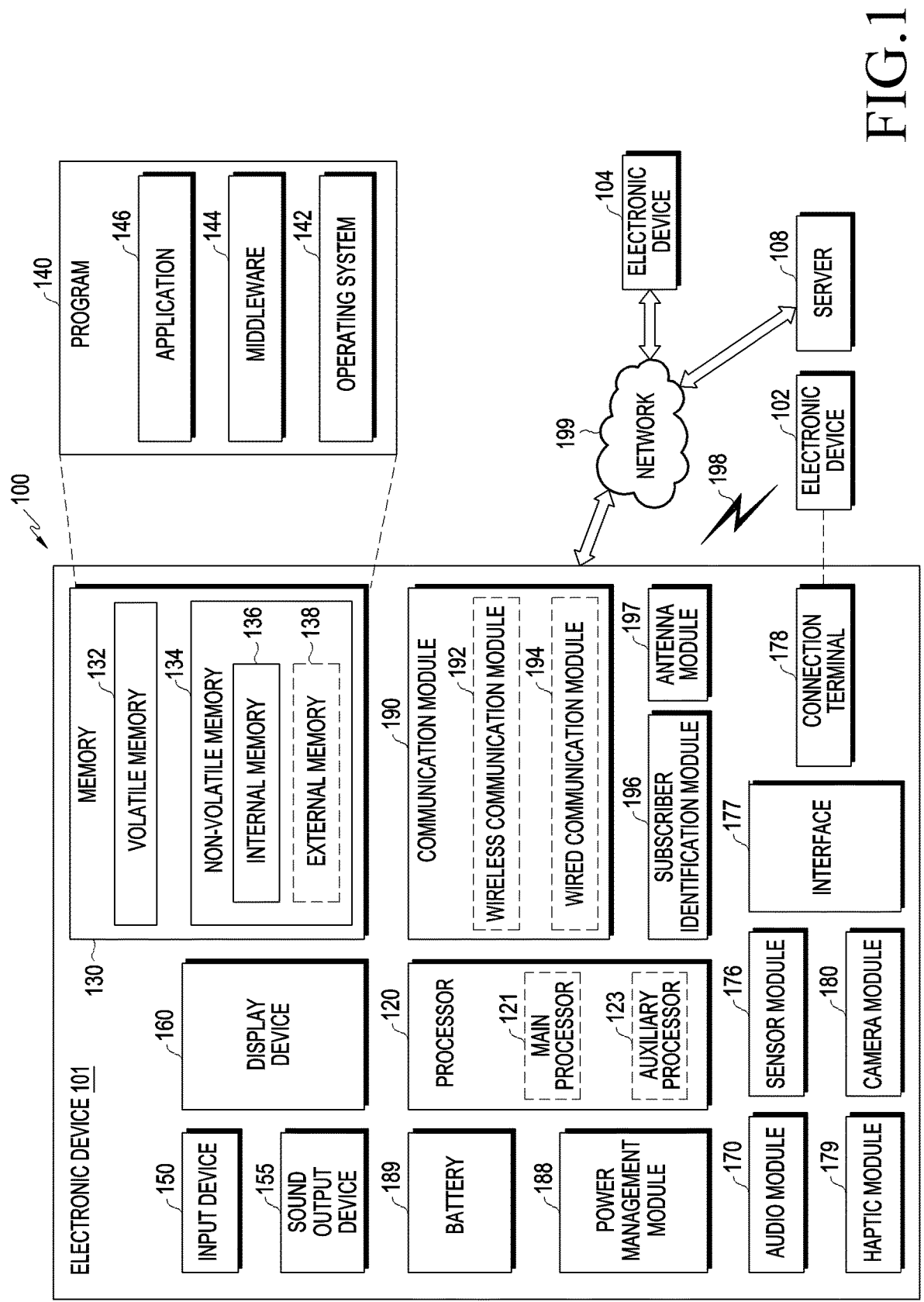
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
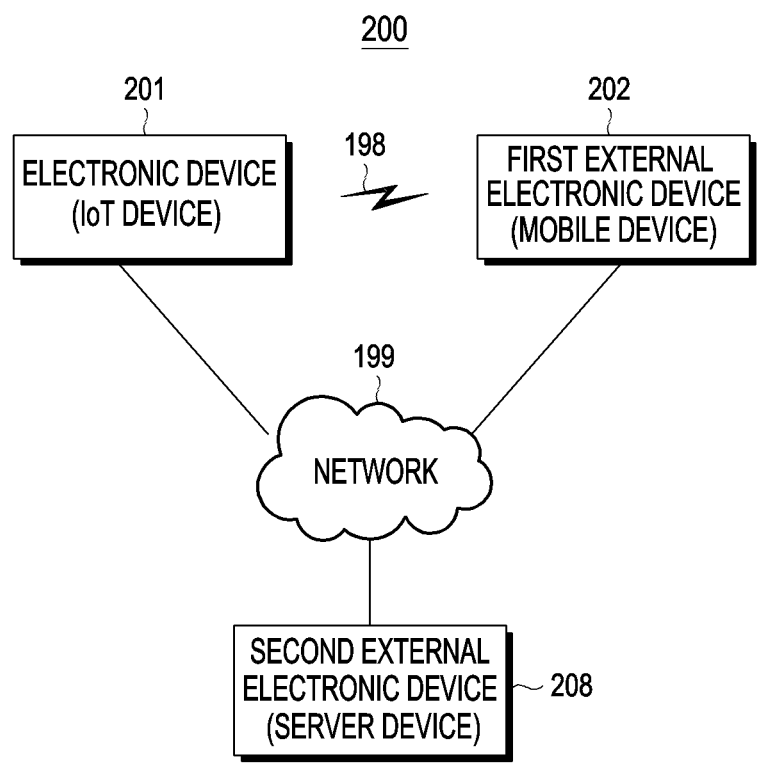
FIG. 2 is a block diagram illustrating a system for device registration of an electronic device according to various embodiments.

FIG. 2 is a block diagram 200 illustrating a system for device registration of an electronic device according to various embodiments.

Referring to FIG. 2, the system for device registration of the electronic device may include an electronic device 201 (e.g., the electronic device 101 of FIG. 1), a first external electronic device 202 (e.g., the electronic device 102 or 104 of FIG. 1), and a second external electronic device 208 (e.g., the server 108 of FIG. 1). According to various embodiments, the electronic device 201, the first external electronic device 202, and the second external electronic device 208 may be configured to be substantially the same as or similar to the electronic device 101 illustrated in FIG. 1.

The electronic device 201 may be configured to be substantially the same as or similar to the electronic device 101 illustrated in FIG. 1 and may be an Internet of things (IoT) device configured by omitting at least one (e.g., the display device 160, the haptic module 179, or the camera module 180) of the components or adding one or more different components. A user may register the electronic device 201 in the second external electronic device 208 (e.g., a server device) using the first external electronic device 202 (e.g., a mobile device) or via a direct communication connection with the second external electronic device 208, thereby remotely controlling the electronic device 201 through the second external electronic device 208. The electronic device 201 may be, for example, an IoT device, such as a home appliance (e.g., a washing machine, a refrigerator, a robotic vacuum cleaner, or a TV), a light, a meter (e.g., an electric meter or a gas meter), a temperature/humidity control device (e.g., an air conditioner, a heating apparatus, or a humidifier), a security device (e.g., an unmanned camera or a security sensor), and a router (e.g., a Wi-Fi router).

The electronic device 201 according to various embodiments may include at least one communication circuit (e.g., the communication module 190 of FIG. 1) for performing communication with the first external electronic device 202 or the second external electronic device 208, at least one processor (e.g., the processor 120 of FIG. 1), and a memory (e.g., the memory 130 of FIG. 1). For example, the electronic device 201 may transmit or receive data to or from the first external electronic device 202 via short-range wireless communication through a short-range communication network (e.g., the first network 198 of FIG. 1, e.g., Bluetooth low energy (BLE) communication, near-field communication (NFC), Bluetooth, Wi-Fi direct, or infrared data association (IrDA)) provided by the at least one communication module 190. Further, the electronic device 201 may transmit or receive data to or from the first external electronic device 202 and/or the second external electronic device 208 via long-range wired or wireless communication through a long-range communication network (e.g., the second network 199 of FIG. 1, e.g., local area network (LAN) communication, power-line communication, wide area network (WAN) communication, cellular network communication, or the Internet) provided by the at least one communication module 190.

The first external electronic device 202 may be configured to be substantially the same as or similar to the electronic device 102 or 104 illustrated in FIG. 1 and may be a mobile device, such as a smartphone. The first external electronic device 202 may have an application installed to support the user in registering the electronic device 201 (e.g., the IoT device) in the second external electronic device 208 (e.g., the server device) or may support accessing a website. Alternatively, the first external electronic device 202 may have an application installed to support remote control of the registered electronic device 201 through the second external electronic device 208 or may support control of the electronic device 201 by accessing a website.

The first external electronic device 202 according to various embodiments may include at least one communication circuit (e.g., the communication module 190 of FIG. 1) for performing communication with the electronic device 201 or the second external electronic device 208, at least one processor (e.g., the processor 120 of FIG. 1), a memory (e.g., the memory 130 of FIG. 1), and a display (e.g., the display device 160 of FIG. 1) to display a user interface for registering or remotely controlling the electronic device 201. For example, the first external electronic device 202 may transmit or receive data to or from the electronic device 201 via short-range wireless communication through a short-range communication network (e.g., the first network 198 of FIG. 1, e.g., Bluetooth low energy (BLE) communication, near-field communication (NFC), Bluetooth, Wi-Fi direct, or infrared data association (IrDA)) provided by the at least one communication module 190. Further, the first external electronic device 202 may transmit or receive data to or from the electronic device 201 and/or the second external electronic device 208 via long-range wired or wireless communication through a long-range communication network (e.g., the second network 199 of FIG. 1, e.g., local area network (LAN) communication, power-line communication, wide area network (WAN) communication, cellular network communication, or the Internet) provided by the at least one communication module 190.

The second external electronic device 208 may be configured to be substantially the same as or similar to the server 108 illustrated in FIG. 1 and may be a server device, such as a cloud server. The second external electronic device 208 may be managed and/or controlled by a manufacturer or manufacturing company that manufactures the electronic device 201 (e.g., the IoT device), may store updated information for registering the electronic device 201 in a memory (e.g., the memory 130 of FIG. 1), and may perform device registration of the electronic device 201 based on the stored information.

The second external electronic device 208 according to various embodiments may include at least one communication circuit (e.g., the communication module 190 of FIG. 1) for performing communication with the electronic device 201 or the first external electronic device 202, at least one processor (e.g., the processor 120 of FIG. 1), and a memory (e.g., the memory 130 of FIG. 1). For example, the second external electronic device 208 may transmit or receive data to or from the electronic device 201 and/or the first external electronic device 202 via long-range wired or wireless communication through a long-range communication network (e.g., the second network 199 of FIG. 1, e.g., local area network (LAN) communication, power-line communication, wide area network (WAN) communication, cellular network communication, or the Internet) provided by the at least one communication module 190.

Figure 3:
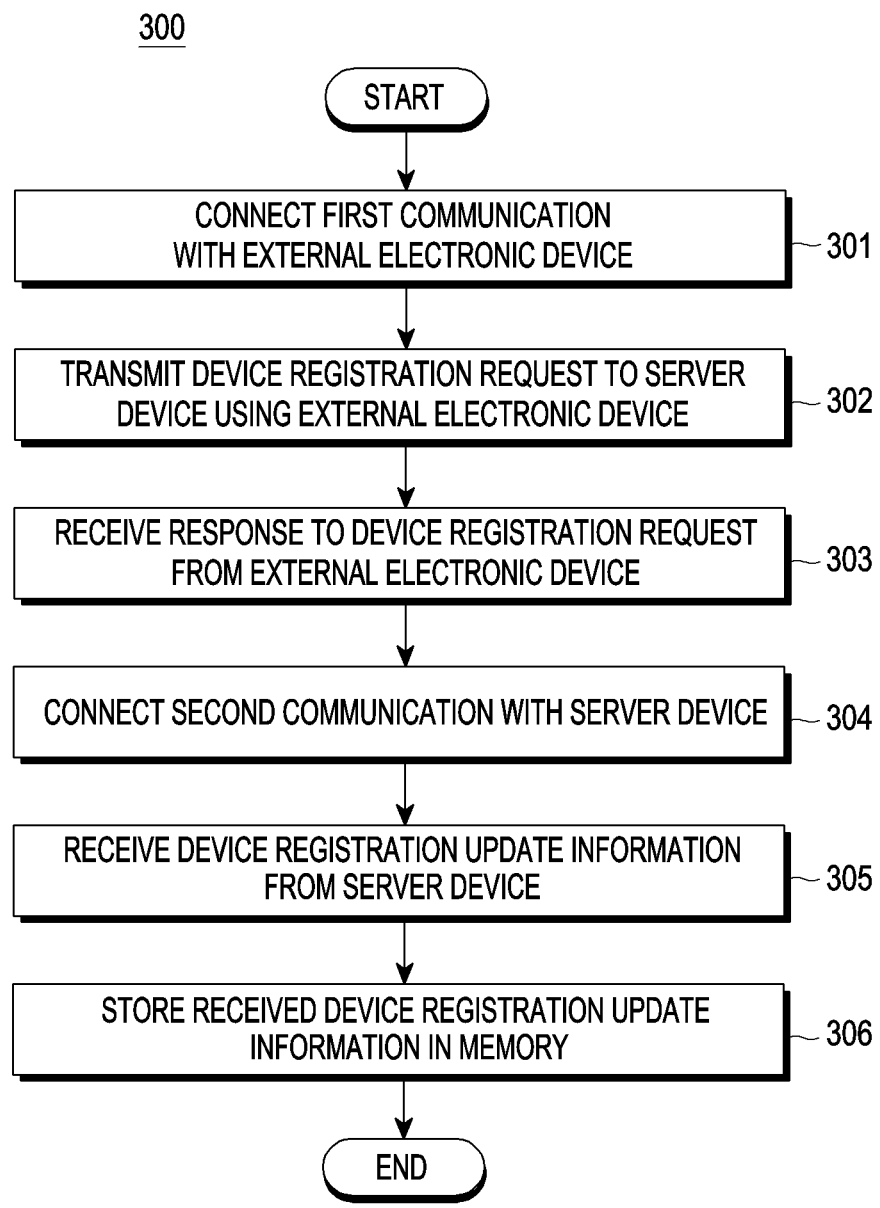
FIG. 3 is a flowchart illustrating an operation in which an electronic device requests device registration of the electronic device according to various embodiments.

FIG. 3 is a flowchart 300 illustrating an operation in which an electronic device requests device registration of the electronic device according to various embodiments.

According to various embodiments, operation 301 to operation 306 may be performed by the electronic device 101 or 201 of FIG. 1 or FIG. 2 or the processor 120. The electronic device 201 may store instructions to execute operation 301 to operation 306 in a memory (e.g., the memory 130 of FIG. 1). In one embodiment, at least one of operation 301 to operation 306 may be omitted, some operations thereof may be performed in parallel at the same time, some operations thereof may be performed in a different order, or other operations may be added.

In operation 301, the electronic device 201 (e.g., the IoT device) according to various embodiments may connect first communication (e.g., short-range wireless communication) via a short-range communication network (e.g., the first network 198 of FIG. 1, e.g., Bluetooth low energy (BLE) communication, near-field communication (NFC), Bluetooth, Wi-Fi direct, or infrared data association (IrDA)) with an external electronic device (e.g., the first external electronic device 202 of FIG. 2, e.g., the mobile device) through at least one communication circuit (e.g., the communication module 190 of FIG. 1). For example, the electronic device 201 may be a device which is in an initialized state when initially purchased by a user and is capable of supporting a long-range communication network 199 through at least one communication circuit but may be a device which does not support the long-range communication network 199 before initial device setting or device registration is performed. When supplied with power and completely booted, the electronic device 201 may automatically or manually connect short-range wireless communication with the external electronic device 202 through a short-range communication network as the external electronic device 202 approaches. Alternatively, when supplied with power and completely booted, the electronic device 201 may connect short-range wireless communication with the external electronic device 202 which is adjacent by a connection request from the external electronic device 202.

In operation 302, the electronic device 201 according to various embodiments may transmit a device registration request (or device registration request message) of the electronic device 201 to the external electronic device 202. For example, when the short-range wireless communication with the external electronic device 202 is established, the electronic device 201 may identify whether the electronic device 201 is in a device-initialized state, and may transmit the device registration request to the external electronic device 202 when it is identified that the electronic device 201 is in the device-initialized state, and the external electronic device 202 may transmit the device registration request to a server device 208. Alternatively, when the short-range wireless communication with the external electronic device 202 is established, the electronic device 201 may identify whether the electronic device 201 is in a device-registered state, and may transmit the device registration request to the external electronic device 202 when it is identified that the electronic device 201 is not in the device-registered state, and the external electronic device 202 may transmit the device registration request to the server device 208.

According to various embodiments, the electronic device 201 may store device registration request information for device registration of the electronic device 201 in the memory (e.g., the memory 130 of FIG. 1) of the electronic device 201. The device registration request information may include key information assigned to the electronic device 201 to perform device registration of the electronic device 201 during the manufacture process of the electronic device 201, and the server device 208 may also store device registration authentication information including key information the same as the foregoing key information to authenticate device registration of the electronic device 201 in a memory (e.g., the memory 130 of FIG. 1) of the server device 208. For example, the key information may be information in a 128-bit universally unique identifier (UUID) format. The electronic device 201 may transmit a device registration request including at least the device registration request information stored in the memory of the electronic device 201 to the server device 208 using the external electronic device 202.

In addition, the electronic device 201 may store device identification information for identifying the electronic device 201 in the memory of the electronic device 201. The device identification information may be a serial number or a hash code assigned to uniquely identify the electronic device 201 during the manufacture process of the electronic device 201, and the server device 208 may also store the device identification information in the memory of the server device 208 to identify the electronic device 201. The electronic device 201 may transmit a device registration request including the device identification information together with the device registration request information stored in the memory of the electronic device 201 to the server device 208 using the external electronic device 202. Alternatively, the serial number may be provided to the user in the form of text or a QR code printed on the surface or box of the electronic device 201. In this case, the user may directly input the serial number through a user interface provided by the external electronic device 202 for device registration of the electronic device 201.

In operation 303, the electronic device 201 according to various embodiments may receive a response to the device registration request from the external electronic device 202. For example, the external electronic device 202 may receive a device registration result notification as a result of the server device 208 performing device registration of the electronic device 201. When the external electronic device 202 receives the device registration result notification from the server device 208, the external electronic device 202 may transmit the received device registration result notification to the electronic device 201.

In operation 304, the electronic device 201 according to various embodiments may connect second communication (e.g., long-range wired or wireless communication) via a long-range communication network (e.g., the second network 199 of FIG. 1, e.g., local area network (LAN) communication, power-line communication, wide area network (WAN) communication, cellular network communication, or the Internet) with the server device 208 through the at least one communication circuit (e.g., the communication module 190 of FIG. 1). For example, the electronic device 201 may be a device which is capable of supporting the long-range communication network 199 through at least one communication circuit but may be a device which does not support the long-range communication network 199 before initial device setting or device registration is performed. The electronic device 201 may automatically or manually connect long-range wired or wireless communication with the server device 208 by performing initial device setting or by transmitting a device registration request using the external electronic device 202, identifying a device registration result, and operating when the long-range communication network 199 is available.

In operation 305, when the long-range wired or wireless communication with the server device 208 is established, the electronic device 201 according to various embodiments may receive device registration update information updated based on registration of the electronic device 201 from the server device 208. For example, the electronic device 201 may receive the device registration update information when the electronic device 201 is initially connected with the server device 208 after transmitting the device registration request for device registration of the electronic device 201 and identifying the device registration result. For example, the device registration update information may be information which is updated and stored in the memory of the server device 208 based on device registration of the electronic device 201, may include the same key information as the key information initially assigned to the electronic device 201 (e.g., at release time) before performing device registration of the electronic device 201, and is updated to newly generated key information based on registration of the electronic device 201.

In operation 306, the electronic device 201 according to various embodiments may store the received device registration update information in the memory of the electronic device 201. For example, the electronic device 201 may update and store the received device registration update information as the device registration request information in the memory of the electronic device 201. For example, when the device registration request information stored in the memory of the electronic device 201 before the device registration request of the electronic device 201 includes the first key information and the device registration update information received from the server device 208 includes the second key information, the electronic device 201 may update the first key information included in the device registration request information to the second key information included in the device registration update information and may store the second key information. According to various embodiments, the electronic device 201 may transmit a signal relating to update of the device registration request information to the server device 208 upon updating the device registration request information.

Figure 4:
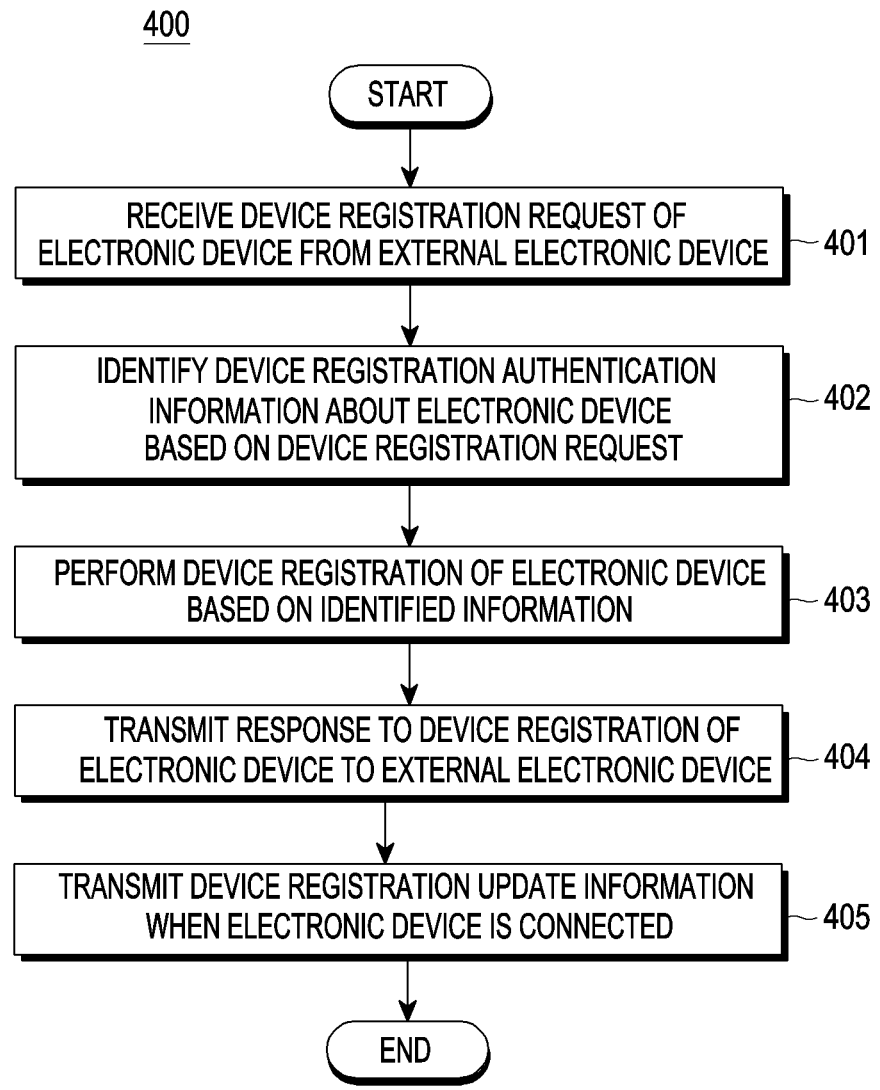
FIG. 4 is a flowchart illustrating an operation in which a server device performs device registration of an electronic device according to various embodiments.

FIG. 4 is a flowchart 400 illustrating an operation in which a server device performs device registration of an electronic device according to various embodiments.

According to various embodiments, operation 401 to operation 405 may be performed by the server device (e.g., the server 108 of FIG. 1 or the second external electronic device (or server device) 208 of FIG. 2) or a processor (e.g., the processor 120 of FIG. 1) included in the server device. The server device 208 may store instructions to execute operation 401 to operation 405 in a memory (e.g., the memory 130 of FIG. 1) of the server device 208. In one embodiment, at least one of operation 401 to operation 405 may be omitted, some operations thereof may be performed in parallel at the same time, some operations thereof may be performed in a different order, or other operations may be added.

In operation 401, the server device 208 according to various embodiments may connect long-range wired or wireless communication via a long-range communication network (e.g., the second network 199 of FIG. 1, e.g., local area network (LAN) communication, power-line communication, wide area network (WAN) communication, cellular network communication, or the Internet) with an external electronic device (e.g., the first external electronic device 202 of FIG. 2, e.g., the mobile device) through at least one communication circuit (e.g., the communication module 190 of FIG. 1) and may receive a device registration request including at least device identification information for identifying an electronic device (IoT device, e.g., the electronic device 201 of FIG. 2) and device registration information for device registration of the electronic device 201 from the external electronic device 202. For example, when the external electronic device 202 is connected, the server device 208 may authenticate a user based on a user account of the external electronic device 202, and when the user is authenticated, the server device 208 may receive the device registration request of the electronic device 201 from the external electronic device 202.

In operation 402, the server device 208 according to various embodiments may identify device registration authentication information for authenticating device registration of the electronic device 201 stored in the memory (e.g., the memory 130 of FIG. 1) of the server device 208 based on the device registration request for the electronic device 201. For example, the server device 208 may identify the device identification information about the electronic device 201 included in the device registration request and may identify the device registration authentication information corresponding to the electronic device 201 stored in the memory of the server device 208 using the identified device identification information. The device registration authentication information may include key information the same as key information assigned to the electronic device 201 during the manufacture process of the electronic device 201. In addition, the server device 208 may store device registration update information updated based on device registration of the electronic device 201 in the memory of the server device 208. The device registration authentication information corresponding to the electronic device 201 and the device registration update information, which are stored in the memory of the server device 208, may include the same key information as the key information initially assigned to the electronic device 201 (e.g., at release time) before performing device registration of the electronic device 201.

In operation 403, the server device 208 according to various embodiments may perform device registration of the electronic device 201 based on the identified device registration authentication information and the device registration request information included in the device registration request. For example, when the key information included in the identified device registration authentication information matches key information included in the device registration request information, the server device 208 may perform device registration of the electronic device 201. Alternatively, when the key information included in the identified device registration authentication information does not match key information included in the device registration request information, the server device 208 may reject device registration of the electronic device 201.

According to various embodiments, during the device registration of the electronic device 201, the server device 208 may identify device registration update information corresponding to the electronic device 201 stored in the memory of the server device 208 based on the device identification information about the electronic device 201 included in the device registration request. When the identified device registration update information matches the device registration request information included in the device registration request, the server device 208 may update previous device registration update information stored in the memory of the server device 208 to the newly generated device registration update information and may store the newly generated device registration update information. For example, when the device registration update information stored in the memory of the server device 208 before the device registration request of the electronic device 201 includes first key information and the device registration request information included in the device registration request includes the first key information, the server device 208 may generate second key information, may update the first key information included in the device registration update information stored in the memory of the server device 208 to the second key information, and may store the second key information. Alternatively, when the device registration update information stored in the memory of the server device 208 before the device registration request of the electronic device 201 includes second key information and the device registration request information included in the device registration request includes first key information, the server device 208 may maintain and store the second key information included in the device registration update information stored in the memory of the server device 208. This is for the server device 208 to perform device registration of the electronic device 201 even when the electronic device 201 is initialized in a state of not being connected to the server device 208 after the server device 208 performs device registration of the electronic device 201 (IoT device).

In operation 404, the server device 208 according to various embodiments may report a result of the device registration of the electronic device 201 to the external electronic device 202. For example, when device registration of the electronic device 201 is performed, the server device 208 may transmit a message indicating that the device registration of the electronic device 201 is successful to the external electronic device 202. When the device registration of the electronic device 201 is rejected, the server device 208 may transmit a message indicating that the device registration of the electronic device 201 is rejected to the external electronic device 202.

In operation 405, when long-range wired or wireless communication with the electronic device 201 is established, the server device 208 according to various embodiments may transmit the device registration update information updated based on the registration of the electronic device 201 to the electronic device 201. For example, when the server device 208 is initially connected with the electronic device 201 after performing the device registration of the electronic device 201 through the external electronic device 202, the server device 208 may transmit the device registration update information to the electronic device 201. According to various embodiments, the server device 208 may receive a signal relating to update of the device registration request information from the electronic device 201 upon transmitting the device registration update information, and may store the device registration authentication information corresponding to the electronic device 201 stored in the memory of the server device 208 in synchronization with the device registration update information upon receiving the signal.

Figure 5:
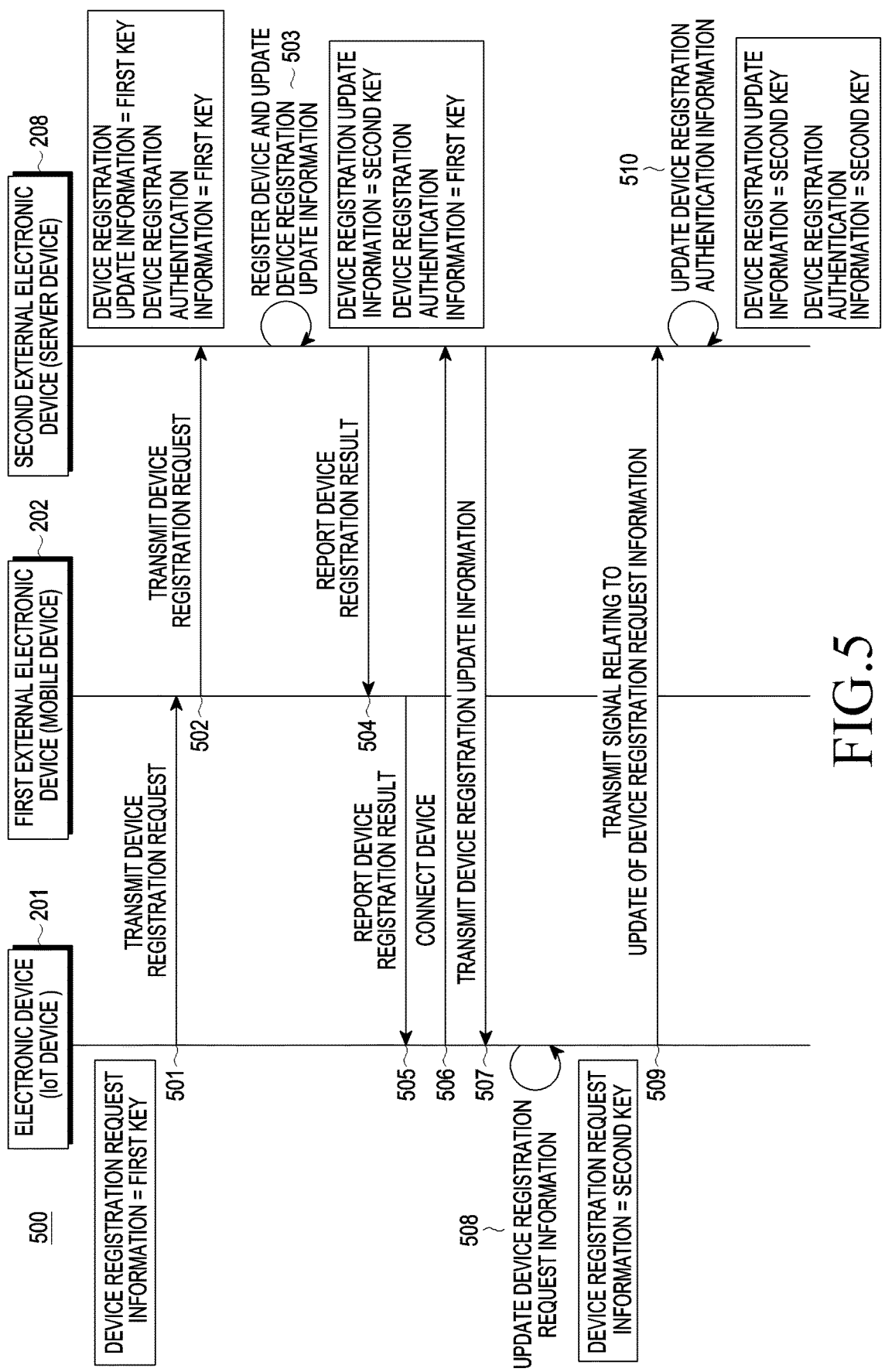
FIG. 5 is a flowchart illustrating an operation in which an electronic device, a first external electronic device, and a second external electronic device perform device registration of the electronic device according to various embodiments.

FIG. 5 is a flowchart 500 illustrating an operation in which an electronic device, a first external electronic device, and a second external electronic device perform device registration of the electronic device according to various embodiments.

According to various embodiments, operation 501 to operation 510 may be performed by the electronic device (IoT device) 201 (e.g., the electronic device 101 of FIG. 1 or the electronic device 201 of FIG. 1), the first external electronic device (mobile device) 202 (e.g., the electronic device 102 or 104 of FIG. 1 or the first external electronic device 202 of FIG. 2), and the second external electronic device (server device) 208 (e.g., the server 108 of FIG. 1 or the second external electronic device 208 of FIG. 2) or processors (e.g., the processor 120 of FIG. 1) respectively included in the electronic device 201, the first external electronic device 202, and the second external electronic device 208. Each of the electronic device 201, the first external electronic device 202, and the second external electronic device 208 may store instructions to execute operation 501 to operation 510 in a memory (e.g., the memory 130 of FIG. 1). In one embodiment, at least one of operation 501 to operation 510 may be omitted, some operations thereof may be performed in parallel at the same time, some operations thereof may be performed in a different order, or other operations may be added.

The electronic device (IoT device) 201 according to various embodiments may store device registration request information for device registration of the electronic device 201 in the memory (e.g., the memory 130 of FIG. 1) of the electronic device 201. For example, the device registration request information may include first key information as initial key information (e.g., key information stored at release time) assigned to the electronic device 201 to perform device registration of the electronic device 201 during the manufacture process of the electronic device 201. Further, the second external electronic device (server device) 208 may also store device registration authentication information including first key information the same as the foregoing first key information to authenticate device registration of the electronic device 201 in the memory (e.g., the memory 130 of FIG. 1) of the second external electronic device 208. In addition, the second external electronic device 208 may store device registration update information including first key information the same as the foregoing first key information before initial device registration of the electronic device 201 is performed as information updated based on device registration of the electronic device 201 in the memory of the second external electronic device 208. For example, the memory of the second external electronic device 208 may store the device registration authentication information and the device registration update information which include the first key information the same as the foregoing first key information as the initial key information assigned to the electronic device 201 during the manufacture process of the electronic device 201 before the initial device registration of the electronic device 201 is performed.

In operation 501, the electronic device (IoT device) 201 according to various embodiments may transmit, to the first external electronic device (mobile device) 202, a device registration request (or device registration request message) to enable device registration of the electronic device 201 to be performed by the second external electronic device (server device) 208 using the first external electronic device (mobile device) 202. For example, the electronic device 201 may connect short-range wireless communication with the first external electronic device 202. For example, when supplied with power and completely booted, the electronic device 201 may automatically or manually connect short-range wireless communication with the external electronic device 202 as the first external electronic device 202 approaches. Alternatively, the electronic device 201 may connect short-range wireless communication with the first external electronic device 202 which is adjacent by a connection request from the first external electronic device 202.

According to various embodiments, when short-range wireless communication with the first external electronic device 202 is established, the electronic device 201 may identify the device registration request information for device registration of the electronic device 201 stored in the memory of the electronic device 201 and may transmit a device registration request including the identified device registration request information to the first external electronic device 202. For example, when the short-range wireless communication with the first external electronic device 202 is established, the electronic device 201 may identify the state of the electronic device 201 and may transmit the device registration request to the first external electronic device 202 based on the identified state. For example, the electronic device 201 may be in a device-initialized state when initially purchased by a user or may be initialized by the user, and when it is identified that the electronic device 201 is in the device-initialized state, the electronic device 201 may transmit the device registration request to the first external electronic device 202. Alternatively, when the electronic device 201 is completely initialized by the user, the electronic device may identify whether device registration of the electronic device 201 has been performed, and when it is identified that device registration of the electronic device 201 has not been performed, the electronic device 201 may transmit the device registration request to the first external electronic device 202.

According to various embodiments, the electronic device 201 may store device identification information for identifying the electronic device 201 in the memory of the electronic device 201. The device identification information may be a serial number or a hash code assigned to uniquely identify the electronic device 201 during the manufacture process of the electronic device 201. The electronic device 201 may include the device identification information in the device registration request to be transmitted to the first external electronic device 202. Alternatively, the device identification information may not be stored in the memory of the electronic device 201 but may be provided to the user in the form of text or a QR code printed on the surface or box of the electronic device 201. In this case, the user may directly input the device identification information through a user interface provided by the external electronic device 202 for device registration of the electronic device 201.

In operation 502, when receiving the device registration request of the electronic device 201 from the electronic device 201, the first external electronic device (mobile device) 202 according to various embodiments may transmit the received device registration request to the second external electronic device (server device) 208. For example, the first external electronic device 202 may be a mobile device which has an application installed to support registration of the electronic device 201 in the second external electronic device 208 or is capable of supporting accessing a website. For example, the first external electronic device 202 may be connected to the second external electronic device 208 via long-range wired or wireless communication through a long-range communication network and may transmit the device registration request received from the electronic device 201 to the second external electronic device 208.

In operation 503, when receiving the device registration request of the electronic device 201, which is transmitted by the electronic device 201 using the first external electronic device 202, the second external electronic device (server device) 208 according to various embodiments may perform device registration for the electronic device 201. For example, the second external electronic device 208 may connect long-range wired or wireless communication with the first external electronic device 202 and may receive the device registration request including the device identification information for identifying the electronic device 201 and device registration information for device registration of the electronic device 201 from the first external electronic device 202. For example, when the second external electronic device 208 is connected with the first external electronic device 202, the second external electronic device 208 may authenticate the user based on a user account of the first external electronic device 202, and when the user is authenticated, the second external electronic device 208 may receive the device registration request of the electronic device 201 from the first external electronic device 202.

According to various embodiments, the second external electronic device 208 may identify the device registration authentication information for authenticating device registration of the electronic device 201 stored in the memory of the second external electronic device 208 based on the device registration request of the electronic device 201. For example, the second external electronic device 208 may identify the device identification information about the electronic device 201 included in the device registration request and may identify device registration authentication information corresponding to the identified device identification information. The second external electronic device 208 may compare key information included in the identified device registration authentication information with key information included in the device registration request information of the electronic device 201, and may perform device registration of the electronic device 201 when these pieces of key information are matched. When the key information included in the identified device registration authentication information and the key information included in the device registration request information of the electronic device 201 are not matched, the second external electronic device 208 may reject device registration of the electronic device 201. For example, when the device registration authentication information stored in the memory of the second external electronic device 208 includes first key information and the device registration request information includes the first key information, the second external electronic device 208 may perform device registration of the electronic device 201.

According to various embodiments, while performing the device registration of the electronic device 201, the second external electronic device 208 may identify the device registration update information corresponding to the electronic device 201 stored in the memory of the second external electronic device 208. The second external electronic device 208 may compare key information included in the identified device registration update information with key information included in the device registration request of the electronic device 201, and may update the device registration update information stored in the memory of the second external electronic device 208 to newly generated device registration update information and may store the newly generated device registration update information when these pieces of key information are matched. For example, when the device registration update information stored in the memory of the second external electronic device 208 includes first key information and the device registration request information includes the first key information, the second external electronic device 208 may generate second key information, may update the first key information included in the device registration update information stored in the memory of the second external electronic device 208 to the generated second key information, and may store the second key information.

In operation 504, the second external electronic device (server device) 208 according to various embodiments may report a result of the device registration of the electronic device 201 to the first external electronic device (mobile device) 202. For example, when the device registration of the electronic device 201 is performed, the second external electronic device 208 may transmit a message indicating that the device registration is successful to the first external electronic device 202. When the device registration of the electronic device 201 is rejected, the second external electronic device 208 may transmit a message indicating that the device registration is rejected to the first external electronic device 202.

In operation 505, when the result of the device registration is received from the second external electronic device 208, the first external electronic device 202 may transmit the received result of the device registration to the electronic device 201.

In operation 506, the electronic device (IoT device) 201 according to various embodiments may connect long-range wired or wireless communication with the second external electronic device (server device) 208 through a long-range communication network 199. For example, the electronic device 201 may automatically or manually connect long-range wired or wireless communication with the second external electronic device 208 by performing initial device setting or by transmitting a device registration request using the first external electronic device 202, identifying a device registration result, and operating when the long-range communication network 199 is available.

In operation 507, when the long-range wired or wireless communication with the second external electronic device 208 is established, the electronic device (IoT device) 201 according to various embodiments may receive the device registration update information (e.g., the second key) updated based on registration of the electronic device 201 from the second external electronic device 208. For example, the electronic device 201 may receive the device registration update information from the second external electronic device 208 when the electronic device 201 is initially connected with the second external electronic device 208 after transmitting the device registration request for device registration of the electronic device 201 and identifying the device registration result.

In operation 508, the electronic device (IoT device) 201 according to various embodiments may store the received device registration update information in the memory of the electronic device 201. For example, the electronic device 201 may update and store the received device registration update information as the device registration request information in the memory of the electronic device 201. For example, when the device registration request information stored in the memory of the electronic device 201 before the device registration request of the electronic device 201 includes the first key information and the device registration update information received from the server device 208 includes the second key information, the electronic device 201 may update the first key information included in the device registration request information to the second key information included in the device registration update information and may store the second key information.

In operation 509, the electronic device (IoT device) 201 according to various embodiments may transmit a signal relating to update of the device registration request information (or a signal relating to acknowledgement of the device registration update information) to the second external electronic device 208 upon updating the device registration request information (or receiving the device registration update information).

In operation 510, the second external electronic device (server device) 208 according to various embodiments may receive a signal relating to update of the device registration request information from the electronic device 201 upon transmitting the device registration update information to the electronic device 201, and may store the device registration authentication information corresponding to the electronic device 201 stored in the memory of the second external electronic device 208 in synchronization with the device registration update information upon receiving the signal. Accordingly, all of the device registration request information stored in the memory of the electronic device 201 and the device registration authentication information and the device registration update information about the electronic device 201, which are stored in the memory of the second external electronic device 208, may be stored in synchronization with the second key information generated based on registration of electronic device 201.

Figure 6:
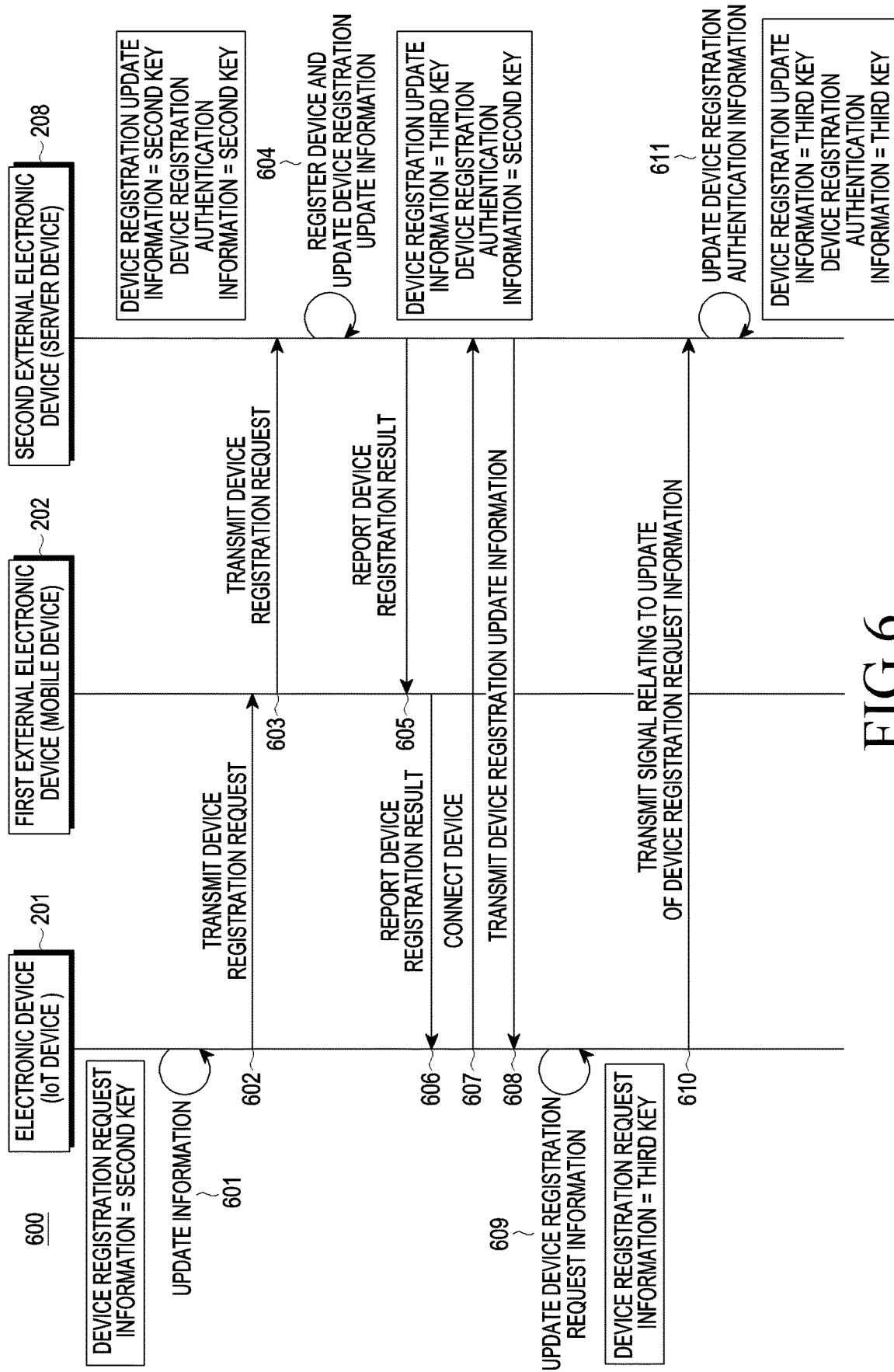
FIG. 6 is a flowchart illustrating an operation in which an electronic device, a first external electronic device, and a second external electronic device perform device registration of the electronic device after device initialization according to various embodiments.

FIG. 6 is a flowchart 600 illustrating an operation in which an electronic device, a first external electronic device, and a second external electronic device perform device registration of the electronic device after device initialization according to various embodiments.

According to various embodiments, operation 601 to operation 611 may be performed by the electronic device (IoT device) 201 (e.g., the electronic device 101 of FIG. 1 or the electronic device 201 of FIG. 1), the first external electronic device (mobile device) 202 (e.g., the electronic device 102 or 104 of FIG. 1 or the first external electronic device 202 of FIG. 2), and the second external electronic device (server device) 208 (e.g., the server 108 of FIG. 1 or the second external electronic device 208 of FIG. 2) or processors (e.g., the processor 120 of FIG. 1) respectively included in the electronic device 201, the first external electronic device 202, and the second external electronic device 208. Each of the electronic device 201, the first external electronic device 202, and the second external electronic device 208 may store instructions to execute operation 601 to operation 611 in a memory (e.g., the memory 130 of FIG. 1). In one embodiment, at least one of operation 601 to operation 611 may be omitted, some operations thereof may be performed in parallel at the same time, some operations thereof may be performed in a different order, or other operations may be added.

Device registration request information stored in the memory (e.g., the memory 130 of FIG. 1) of the electronic device (IoT device) 201 according to various embodiments may include second key information as key information updated based on device registration of the electronic device 201. Further, device registration authentication information and device registration update information corresponding to the electronic device 201 stored in the memory (e.g., the memory 130 of FIG. 1) of the second external electronic device (server device) 208 may also include the second key information as the key information updated based on device registration of the electronic device 201.

In operation 601, the electronic device (IoT device) 201 according to various embodiments may change the state of the electronic device 201 to a device-initialized state. For example, the electronic device 201 may change the state of the electronic device 201 to the device-initialized state as needed by a user (e.g., when the electronic device is transferred to a different user). For example, the electronic device 201 may have a separate device initialization button configured as hardware or software to perform device initialization of the electronic device 201, and the user may press the device initialization button, thereby performing device initialization of the electronic device 201. When the state of the electronic device 201 is changed to the device-initialized state, device settings or device registration previously configured for the electronic device 201 may be initialized. According to various embodiments, when the electronic device 201 is changed to the device-initialized state, data accumulated and stored in the memory of the electronic device 201 according to use of the electronic device 201 may be deleted, but the device registration request information for device registration of the electronic device 201 and device identification information for identifying the electronic device 201 may not be deleted but be retained. For example, the device registration request information and the device identification information may be stored in a separate security area, such as TrustZone, provided as software in the memory of the electronic device 201 or in a separate security memory configured as hardware.

According to various embodiments, the electronic device 201 may store device initialization count information indicating a device initialization count of the electronic device 201 in the memory of the electronic device 201. When device initialization of the electronic device 201 is detected, the electronic device 201 (e.g., the processor 120 of FIG. 1) may update the device initialization count information by increasing the device initialization count by 1 and may store the same in the memory of the electronic device 201. For example, the device initialization count information is information that can indicate that the electronic device 201 has been initialized, and the second external electronic device 208 may determine whether device initialization of the electronic device 201 is performed by identifying the device initialization count information and may deregister the electronic device 201 registered in the second external electronic device 208 based on whether device initialization of the electronic device 201 is performed. When long-range wired or wireless communication with the second external electronic device 208 is established, the electronic device 201 may transmit the updated device initialization count information to the second external electronic device 208.

In operation 602, the electronic device (IoT device) 201 (e.g., the processor 120 of FIG. 1) according to various embodiments may transmit, to the first external electronic device (mobile device) 202, a device registration request (or device registration request message) to enable device registration of the electronic device 201 to be performed by the second external electronic device (server device) 208 using the first external electronic device (mobile device) (e.g., the electronic device 102 or 104 of FIG. 1 or the first external electronic device 202 of FIG. 2). For example, when it is identified that the state of the electronic device 201 is the device-initialized state, the electronic device 201 may transmit the device registration request to the first external electronic device 202. Alternatively, when initial device setting is completed by the user, the electronic device 201 may identify whether device registration of the electronic device 201 has been performed, and may transmit the device registration request to the first external electronic device 202 when it is identified that device registration of the electronic device 201 has not been performed.

In operation 603, when receiving the device registration request of the electronic device 201 from the electronic device 201, the first external electronic device (mobile device) 202 according to various embodiments may transmit the received device registration request to the second external electronic device (server device) 208.

In operation 604, when receiving the device registration request of the electronic device 201 transmitted by the electronic device 201 using the first external electronic device 202, the second external electronic device (server device) 208 according to various embodiments may perform device registration of the electronic device 201.

According to various embodiments, the second external electronic device 208 may identify the device registration authentication information stored in the memory (e.g., the memory 130 of FIG. 1) of the second external electronic device 208 based on the received device registration request, and may perform device registration of the electronic device 201 when it is identified that both key information included in the identified device registration authentication information and key information included in the device registration request information are the second key information. Further, the second external electronic device 208 may identify the device registration update information corresponding to information about the electronic device 201 stored in the memory of the second external electronic device 208 based on the received device registration request, may generate third key information when it is identified that both key information included in the identified device registration update information and the key information included in the device registration request information are the second key information, may update the second key information included in the device registration update information stored in the memory of the second external electronic device 208 to the third key information, and may store the third key information.

In operation 605, the second external electronic device (server device) 208 according to various embodiments may report a result of the device registration of the electronic device 201 (or a signal relating to acknowledgement of the device registration request) to the first external electronic device (mobile device) 202.

In operation 606, when receiving the result of the device registration from the second external electronic device 208, the first external electronic device 202 may transmit the received result of the device registration to the electronic device 201.

In operation 607, the electronic device (IoT device) 201 according to various embodiments may connect long-range wired or wireless communication with the second external electronic device (server device) 208 through a long-range communication network 199.

In operation 608, when the long-range wired or wireless communication with the second external electronic device 208 is established, the electronic device (IoT device) 201 according to various embodiments may receive device registration update information updated based on registration of the electronic device 201 from the second external electronic device 208. For example, the electronic device 201 may receive the device registration update information from the second external electronic device 208 when the electronic device 201 is initially connected with the second external electronic device 208 after transmitting the device registration request for device registration of the electronic device 201 and identifying the result of the device registration.

In operation 609, the electronic device (IoT device) 201 according to various embodiments may store the received device registration update information in the memory of the electronic device 201. For example, the electronic device 201 may update and store the received device registration update information as the device registration request information in the memory of the electronic device 201. For example, when the device registration request information stored in the memory of the electronic device 201 before the device registration request of the electronic device 201 includes the second key information and the device registration update information received from the server device 208 includes the third key information, the electronic device 201 may update the second key information included in the device registration request information to the third key information included in the device registration update information and may store the third key information.

In operation 610, the electronic device (IoT device) 201 according to various embodiments may transmit a signal relating to update of the device registration request information (or a signal relating to acknowledgement of the device registration update information) to the second external electronic device 208 upon updating the device registration request information (or receiving the device registration update information).

In operation 611, the second external electronic device (server device) 208 according to various embodiments may receive a signal relating to update of the device registration request information from the electronic device 201 upon transmitting the device registration update information to the electronic device 201, and may store the device registration authentication information corresponding to the electronic device 201 stored in the memory of the second external electronic device 208 in synchronization with the device registration update information upon receiving the signal. Accordingly, all of the device registration request information stored in the memory of the electronic device 201 and the device registration authentication information and the device registration update information about the electronic device 201, which are stored in the memory of the second external electronic device 208, may be stored in synchronization with the third key information generated based on registration of electronic device 201.

Figure 7:
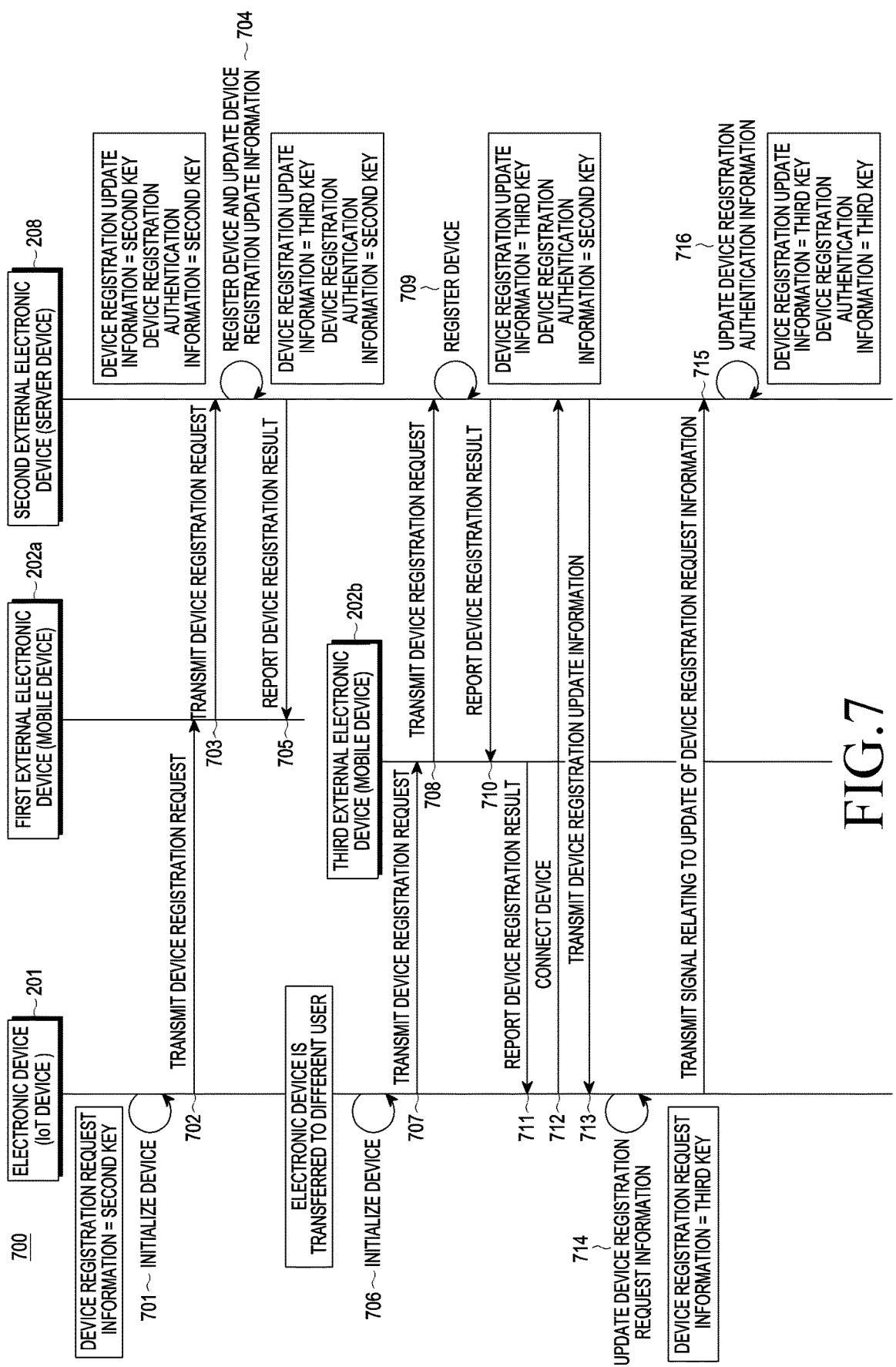
FIG. 7 is a flowchart illustrating an operation in which a different user performs device initialization and then device registration when an electronic device, a first external electronic device, and a second external electronic device perform device registration of the electronic device but remain unsynchronized according to various embodiments.

FIG. 7 is a flowchart 700 illustrating an operation in which a different user performs device initialization and then device registration when an electronic device, a first external electronic device, and a second external electronic device perform device registration of the electronic device but remain unsynchronized according to various embodiments.

According to various embodiments, operation 701 to operation 716 may be performed by the electronic device (IoT device) 201 (e.g., the electronic device 101 of FIG. 1 or the electronic device 201 of FIG. 1), the first external electronic device (mobile device) 202a (e.g., the electronic device 102 or 104 of FIG. 1 or the first external electronic device 202 of FIG. 2), the second external electronic device (server device) 208 (e.g., the server 108 of FIG. 1 or the second external electronic device 208 of FIG. 2), a third external electronic device (mobile device) 202b (e.g., the electronic device 102 or 104 of FIG. 1 or the first external electronic device 202 of FIG. 2), or processors (e.g., the processor 120 of FIG. 1) respectively included in the electronic device 201, the first external electronic device 202a, the second external electronic device 208, and the third external electronic device 202b. Each of the electronic device 201, the first external electronic device 202a, the second external electronic device 208, and the third external electronic device 202b may store instructions to execute operation 701 to operation 716 in a memory (e.g., the memory 130 of FIG. 1). In one embodiment, at least one of operation 701 to operation 716 may be omitted, some operations thereof may be performed in parallel at the same time, some operations thereof may be performed in a different order, or other operations may be added.

Device registration request information stored in the memory (e.g., the memory 130 of FIG. 1) of the electronic device (IoT device) 201 according to various embodiments may include second key information as key information updated based on device registration of the electronic device 201. Further, device registration authentication information and device registration update information corresponding to the electronic device 201 stored in the memory (e.g., the memory 130 of FIG. 1) of the second external electronic device (server device) 208 may also include the second key information as the key information updated based on device registration of the electronic device 201.

In operation 701, the electronic device (IoT device) 201 according to various embodiments may change the state of the electronic device 201 to a device-initialized state. For example, the electronic device 201 may change the state of the electronic device 201 to the device-initialized state as needed by a user (e.g., when the electronic device is transferred to a different user).

In operation 702, the electronic device (IoT device) 201 according to various embodiments may transmit, to the first external electronic device (mobile device) 202a, a device registration request (or device registration request message) to enable device registration of the electronic device 201 to be performed by the second external electronic device (server device) 208 using the first external electronic device (mobile device) 202a (e.g., the electronic device 102 or 104 of FIG. 1 or the first external electronic device 202 of FIG. 2).

In operation 703, when receiving the device registration request of the electronic device 201 from the electronic device 201, the first external electronic device (mobile device) 202a according to various embodiments may transmit the received device registration request to the second external electronic device (server device) 208.

In operation 704, when the device registration request of the electronic device 201 transmitted by the electronic device 201 using the first external electronic device 202a is received and both key information included in the device registration update information stored in the memory (e.g., the memory 130 of FIG. 1) of the second external electronic device 208 and key information included in the device registration request information are the second key information, the second external electronic device (server device) 208 according to various embodiments may perform device registration of the electronic device 201. Further, the second external electronic device 208 may generate third key information based on the device registration of the electronic device 201, may update the second key information included in the device registration update information stored in the memory of the second external electronic device 208 to the third key information, and may store the third key information.

In operation 705, the second external electronic device (server device) 208 according to various embodiments may report a result of the device registration of the electronic device 201 (or a signal relating to acknowledgement of the device registration request) to the first external electronic device (mobile device) 202a. According to one embodiment, the electronic device (IoT device) 201 may be transferred to the different user with the device registration of the electronic device 201 not completed after requesting the device registration of the electronic device 201. For example, the first external electronic device 202a may have not transmitted the result of the device registration, received from the second external electronic device 208, to the electronic device 201. In this case, the electronic device (IoT device) 201 have not received device information update information updated based on the device registration and may thus retain and store the second key information before the device registration request as it is in the device registration request information stored in the memory of the electronic device 201.

In operation 706, the electronic device (IoT device) 201 according to various embodiments may change the state of the electronic device 201 to the device-initialized state. For example, the electronic device 201 may change the state of the electronic device 201 to the device-initialized state as needed by the user (e.g., when the electronic device is transferred to a different user). For example, the electronic device 201 may be transferred to the different user, and the different user may change the state of the electronic device 201 to the device-initialized state.

In operation 707, the electronic device (IoT device) 201 according to various embodiments may transmit, to a third external electronic device (mobile device) 202b which is different from the first external electronic device 202a of the previous user, a device registration request (or device registration request message) to enable device registration of the electronic device 201 to be performed by the second external electronic device (server device) 208 using the third external electronic device (mobile device) 202b.

In operation 708, when receiving the device registration request of the electronic device 201 from the electronic device 201, the third external electronic device (mobile device) 202b according to various embodiments may transmit the received device registration request to the second external electronic device (server device) 208.

According to one embodiment, the device registration update information and the device registration authentication information stored in the memory of the second external electronic device (server device) 208 may not be matched. For example, the device registration update information stored in the memory of the second external electronic device 208 may include the third key information updated based on the registration of the electronic device 201, and the device registration authentication information may include the second key information before the device registration of the electronic device 201 retained as it is.

In operation 709, when receiving the device registration request of the electronic device 201 transmitted by the electronic device 201 using the third external electronic device 202b, the second external electronic device (server device) 208 according to various embodiments may perform device registration of the electronic device 201. For example, when the third external electronic device 202b is connected, the second external electronic device 208 may authenticate the user based on a user account of the third external electronic device 202b, and when the user is authenticated, the second external electronic device 208 may receive the device registration request for the electronic device 201 from the third external electronic device 202b.

According to various embodiments, the second external electronic device (server device) 208 may identify the device registration authentication information stored in the memory of the second external electronic device 208 based on the received device registration request, and may perform the device registration of the electronic device 201 when it is identified both key information included in the identified device registration authentication information and key information included in device registration request information are the second key information.

According to one embodiment, the device registration update information stored in the memory of the second external electronic device 208 and the device registration request information received from the electronic device 201 may not be matched. For example, when it is identified based on the received device registration request that the key information included in the device registration update information stored in the memory of the second external electronic device 208, which is the third key information, does not match the key information included in the device registration request, which is the second key information, the second external electronic device 208 may retain and store the third key information included in the device registration update information stored in the memory of the second external electronic device 208 as it is, instead of generating new key information.

In operation 710, the second external electronic device (server device) 208 according to various embodiments may report a result of the device registration of the electronic device 201 (or a signal relating to acknowledgement of the device registration request) to the third external electronic device (mobile device) 202*b*.

In operation 711, when receiving the result of the device registration from the second external electronic device 208, the third external electronic device 202*b* may transmit the received result of the device registration to the electronic device 201.

In operation 712, the electronic device (IoT device) 201 according to various embodiments may connect long-range wired or wireless communication with the second external electronic device (server device) 208 through a long-range communication network 199. For example, the electronic device 201 may automatically or manually connect long-range wired or wireless communication with the second external electronic device 208 by performing initial device setting or by transmitting a device registration request using the third external electronic device 202*b*, identifying a device registration result, and operating with the long-range communication network 199 available.

In operation 713, when the long-range wired or wireless communication with the second external electronic device 208 is established, the electronic device (IoT device) 201 according to various embodiments may receive device registration update information including the third key information which is generated by the second external electronic device 208 not based on the device registration by the device registration request of the electronic device 201 but based on previous device registration.

In operation 714, the electronic device (IoT device) 201 according to various embodiments may store the received device registration update information in the memory of the electronic device 201. For example, the electronic device 201 may update and store the received device registration update information as the device registration request information in the memory of the electronic device 201. For example, when the device registration request information stored in the memory of the electronic device 201 before the device registration request of the electronic device 201 includes the second key information and the device registration update information received from the server device 208 includes the third key information, the electronic device 201 may update the second key information included in the device registration request information to the third key information included in the device registration update information and may store the third key information.

In operation 715, the electronic device (IoT device) 201 according to various embodiments may transmit a signal relating to update of the device registration request information (or a signal relating to acknowledgement of the device registration update information) to the second external electronic device 208 upon updating the device registration request information (or receiving the device registration update information).

In operation 716, the second external electronic device (server device) 208 according to various embodiments may receive a signal relating to update of the device registration request information from the electronic device 201 upon transmitting the device registration update information to the electronic device 201, and may store the device registration authentication information corresponding to the electronic device 201 stored in the memory of the second external electronic device 208 in synchronization with the device registration update information upon receiving the signal. Accordingly, all of the device registration request information stored in the memory of the electronic device 201 and the device registration authentication information and the device registration update information about the electronic device 201, which are stored in the memory of the second external electronic device 208, may be stored in synchronization with the third key information generated based on registration of electronic device 201.

Figure 8:
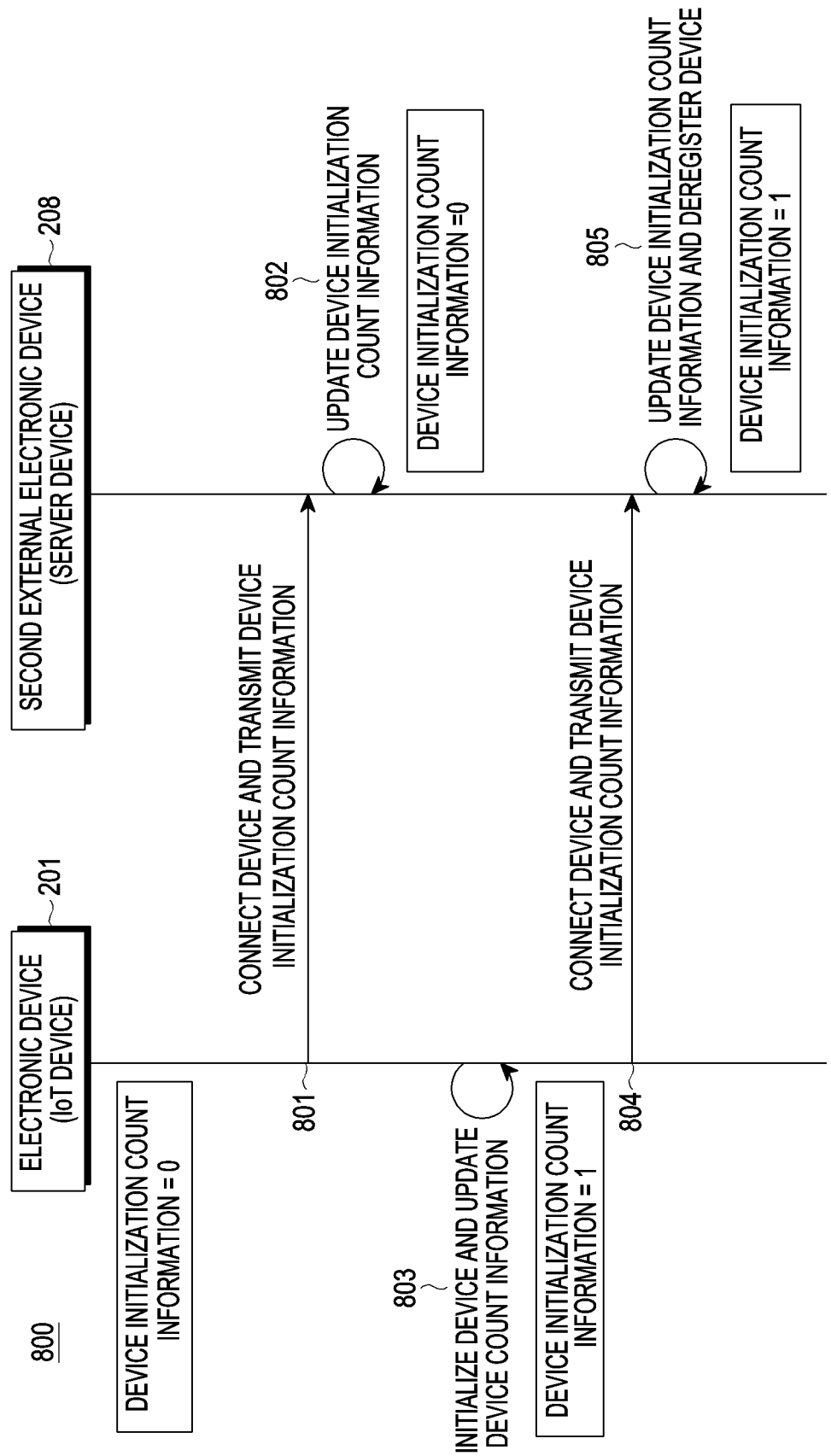
FIG. 8 is a flowchart illustrating an operation in which an electronic device and a second external electronic device perform device deregistration according to device initialization of the electronic device according to various embodiments.

FIG. 8 is a flowchart 800 illustrating an operation in which an electronic device and a second external electronic device perform device deregistration according to device initialization of the electronic device according to various embodiments.

According to various embodiments, operation 801 to operation 805 may be performed by the electronic device (IoT device) 201 (e.g., the electronic device 101 of FIG. 1 or the electronic device 201 of FIG. 2) and the second external electronic device (server device) 208 (e.g., the server 108 of FIG. 1 or the second external electronic device 208 of FIG. 2) or processors (e.g., the processor 120 of FIG. 1) respectively included in the electronic device 201 and the second external electronic device 208. Each of the electronic device 201 and the second external electronic device 208 may store instructions to execute operation 801 to operation 805 in a memory (e.g., the memory 130 of FIG. 1). In one embodiment, at least one of operation 801 to operation 805 may be omitted, some operations thereof may be performed in parallel at the same time, some operations thereof may be performed in a different order, or other operations may be added.

The electronic device (IoT device) 201 according to various embodiments may store device initialization count information indicating a device initialization count of the electronic device 201 in the memory (e.g., the memory 130 of FIG. 1) of the electronic device 201. For example, the device initialization count information may be set to 0 when the electronic device 201 is produced and released.

In operation 801, when connecting long-range wired or wireless communication with the second external electronic device 208, the electronic device (IoT device) 201 according to various embodiments may transmit the device initialization count information stored in the memory of the electronic device 201 to the second external electronic device 208. For example, the electronic device 201 may automatically or manually connect long-range wired or wireless communication with the second external electronic device 208 by performing initial device setting or by operating with a long-range communication network 199 available when device registration of the electronic device 201 is completed. The electronic device 201 may transmit the device initialization count information to the second external electronic device 208 connected via the long-range wired or wireless communication.

In operation 802, the second external electronic device (server device) 208 according to various embodiments may receive the device initialization count information from the electronic device 201 connected via the long-range wired or wireless communication. According to various embodiments, the memory (e.g., the memory 130 of FIG. 1) of the second external electronic device (server device) 208 may store device initialization count information about the electronic device 201 of which device registration has been completed. For example, the second external electronic device 208 may receive the device initialization count information from the electronic device 201 when initially connecting with the electronic device 201 after performing device registration of the electronic device 201 which initially requests device registration, and may generate and store device initialization count information corresponding to the electronic device 201 in the memory of the second external electronic device 208. The device initialization count information stored in the memory of the second external electronic device 208 may have a device initialization count of 0 which is the same as that in the device initialization count information stored in the memory of the electronic device 201.

In operation 803, the electronic device (IoT device) 201 according to various embodiments may change the state of the electronic device 201 to a device-initialized state. For example, the electronic device 201 may change the state of the electronic device 201 to the device-initialized state as needed by a user (e.g., when the electronic device is transferred to a different user). For example, the electronic device 201 may have a separate device initialization button configured as hardware or software to perform device initialization of the electronic device 201, and the user may press the device initialization button, thereby performing device initialization of the electronic device 201. When the state of the electronic device 201 is changed to the device-initialized state, device settings or device registration previously configured for the electronic device 201 may be initialized. According to various embodiments, when the electronic device 201 is changed to the device-initialized state, data accumulated and stored in the memory of the electronic device 201 according to use of the electronic device 201 may be deleted, but the device registration request information for device registration of the electronic device 201 and device identification information for identifying the electronic device 201 may be retained rather than being deleted.

According to various embodiments, when device initialization of the electronic device 201 is detected, the electronic device 201 may update the device initialization count information by increasing the device initialization count by 1 and may store the same in the memory. For example, the electronic device 201 may store the device initialization count information set to 1 by increasing a previous device initialization count of 0 by 1 in the memory of the electronic device 201.

In operation 804, when long-range wired or wireless communication with the second external electronic device 208 is established, the electronic device (IoT device) 201 according to various embodiments may transmit the device initialization count information stored in the memory of the electronic device 201 to the second external electronic device 208. For example, after performing device initialization, the electronic device 201 may automatically or manually connect long-range wired or wireless communication with the second external electronic device 208 by performing initial device setting or by operating with a long-range communication network 199 available when device registration of the electronic device 201 is completed. The electronic device 201 may transmit the device initialization count information to the second external electronic device 208 connected via the long-range wired or wireless communication.

In operation 805, when receiving the device initialization count information from the electronic device 201 connected via the long-range wired or wireless communication, the second external electronic device (server device) 208 according to various embodiments may release the device registration of the electronic device 201 and may update the device initialization count information corresponding to the electronic device 201 stored in the memory of the second external electronic device 208 based on the received device initialization count information. For example, the second external electronic device 208 may identify the device registration state of the electronic device 201 based on device identification information about the electronic device 201 connected via long-range wired or wireless communication. When it is identified that the electronic device 201 is in the device-registered state, the second external electronic device 208 may identify the device initialization count information corresponding to the electronic device 201 stored in the memory of the second external electronic device 208, and may release the device registration of the electronic device 201 when a device initialization count of the identified device initialization count information is smaller than the device initialization count of the received device initialization count information. For example, the device initialization count of the device initialization count information stored in the memory of the second external electronic device 208 may be set to 0 and the device initialization count of the device initialization count information received from the electronic device 201 is set to 1, the second external electronic device 208 may release the device registration of the electronic device 201 and may update the device initialization count of the device initialization count information stored in the memory of the second external electronic device 208 by 1 and may store the device initialization count.

Figure 9:
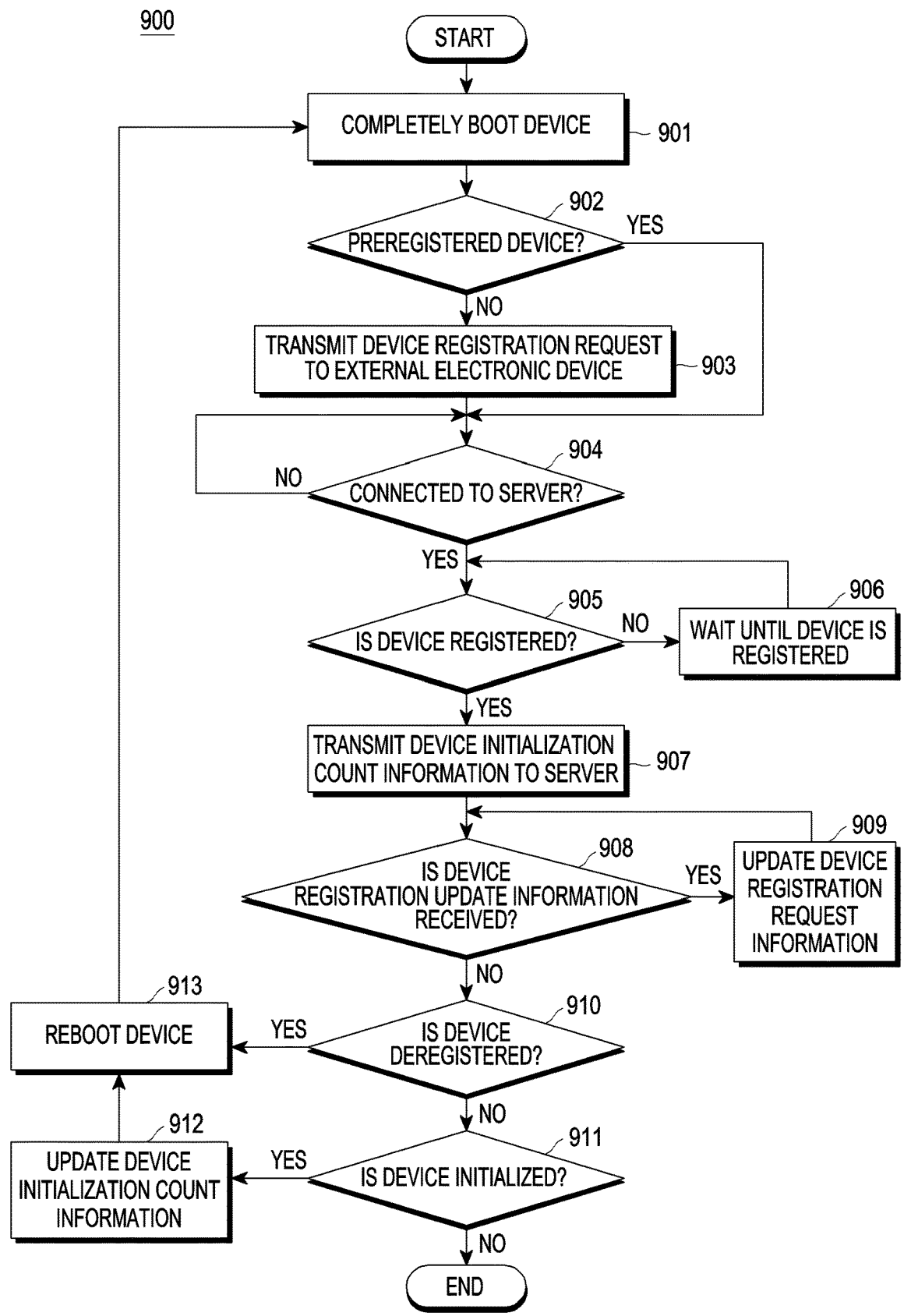
FIG. 9 is a flowchart illustrating an operation performed by an electronic device according to various embodiments.

FIG. 9 is a flowchart 900 illustrating an operation performed by an electronic device (IoT device) according to various embodiments.

According to various embodiments, operation 901 to operation 913 may be performed by the electronic device 101 or 201 of FIG. 1 or FIG. 2 or the processor 120. The electronic device 201 may store instructions to execute operation 901 to operation 913 in a memory (e.g., the memory 130 of FIG. 1). In one embodiment, at least one of operation 901 to operation 913 may be omitted, some operations thereof may be performed in parallel at the same time, some operations thereof may be performed in a different order, or other operations may be added.

In operation 901, the electronic device 201 (e.g., the IoT device) according to various embodiments may be supplied with power and may be completely booted.

In operation 902, the electronic device 201 according to various embodiments may identify whether the state of the electronic device 201 is a device-registered state. For example, the electronic device 201 may be in a device-initialized state when initially purchased by a user, or may be in a state of being initialized by the user. When it is identified that the electronic device 201 is in the device-initialized state, it may be identified that device registration of the electronic device 201 has not been performed. When it is identified that the electronic device 201 is in a preregistered state, the electronic device 201 may perform operation 904, and when it is identified that the electronic device 201 is not in the preregistered state, the electronic device 201 may perform operation 903.

In operation 903, when it is identified that the electronic device 201 is not in the device-registered state, the electronic device 201 according to various embodiments may connect short-range wireless communication with an external electronic device 202 (e.g., the electronic device 102 or 104 of FIG. 1 or the first external electronic device 202 of FIG. 2) (e.g., a mobile device) through a short-range communication network (e.g., the first network 198 of FIG. 1) and may transmit a device registration request of the electronic device 201 to a server device 208 (e.g., the server 108 of FIG. 1 or the second external electronic device 208 of FIG. 2) using the external electronic device 202 connected via the short-range wireless communication.

In operation 904, the electronic device 201 according to various embodiments may identify whether a long-range communication network (e.g., the second network 199 of FIG. 1) with the server device 208 (e.g., the server 108 of FIG. 1 or the second external electronic device 208 of FIG. 2) is available. For example, the electronic device 201 may connect long-range wired or wireless communication with the server device 208 when performing initial device setting or when transmitting a device registration request using the external electronic device 202 and identifying a device registration result. When the long-range wired or wireless communication with the server device 208 is established, the electronic device 201 may perform operation 905, and when the long-range wired or wireless communication is not established, the electronic device 201 may reattempt connection to the server device 208 by performing initial device setting.

In operation 905, when the electronic device 201 is in the device-registered state, the electronic device 201 according to various embodiments may perform operation 907, and when the electronic device 201 is not in the device-registered state, the electronic device 201 may wait until device registration of the electronic device 201 is completed in operation 906.

In operation 907, the electronic device 201 according to various embodiments may transmit device initialization count information stored in the memory of the electronic device 201 to the server device 208.

In operation 908, the electronic device 201 according to various embodiments may receive device registration update information which is updated by the server device 208 based on the device registration of the electronic device 201. Upon receiving the device registration update information from the server device 208, the electronic device 201 may update device registration request information stored in the memory of the electronic device 201 based on the received device registration update information in operation 909. When the device registration update information is not received, the electronic device 201 may perform operation 910.

In operation 910, the electronic device 201 according to various embodiments may determine whether the device registration of the electronic device 201 is released. When the device registration of the electronic device 201 is released, the electronic device 201 may perform operation 913, and when the device registration of the electronic device 201 is not released, the electronic device 201 may perform operation 911. For example, when the device registration of the electronic device 201 is maintained, the electronic device 201 may perform a function which can be provided according to the device registration, and when the device registration is released, the electronic device 201 is rebooted, and cannot perform the function which can be provided according to the device registration after completely rebooted.

In operation 911, the electronic device 201 according to various embodiments may determine that the electronic device 201 is initialized. For example, the electronic device 201 may change to the device-initialized state as needed by a user (e.g., when the electronic device is transferred to a different user). For example, the electronic device 201 may have a separate device initialization button configured as hardware or software to perform device initialization of the electronic device 201, and the user may press the device initialization button, thereby performing device initialization of the electronic device 201. When device initialization of the electronic device 201 is not performed, the electronic device 201 may terminate a method according to this flowchart, and when the device initialization of the electronic device 201 is performed, the electronic device 201 may perform operation 912. For example, when the electronic device 201 is not initialized, the electronic device 201 may perform the function which can be provided according to the device registration, and the device initialization is detected, the electronic device 201 may perform operation 912.

In operation 912, when the device initialization of the electronic device 201 is detected, the electronic device 201 according to various embodiments may update the device initialization count information by increasing the device initialization count by 1 and may store the same in the memory of the electronic device 201. For example, the electronic device 201 may store the device initialization count information set to 1 by increasing a previous device initialization count of 0 by 1 in the memory of the electronic device 201.

In operation 913, the electronic device 201 according to various embodiments may be rebooted according to the device initialization of the electronic device 201.

Figure 10:
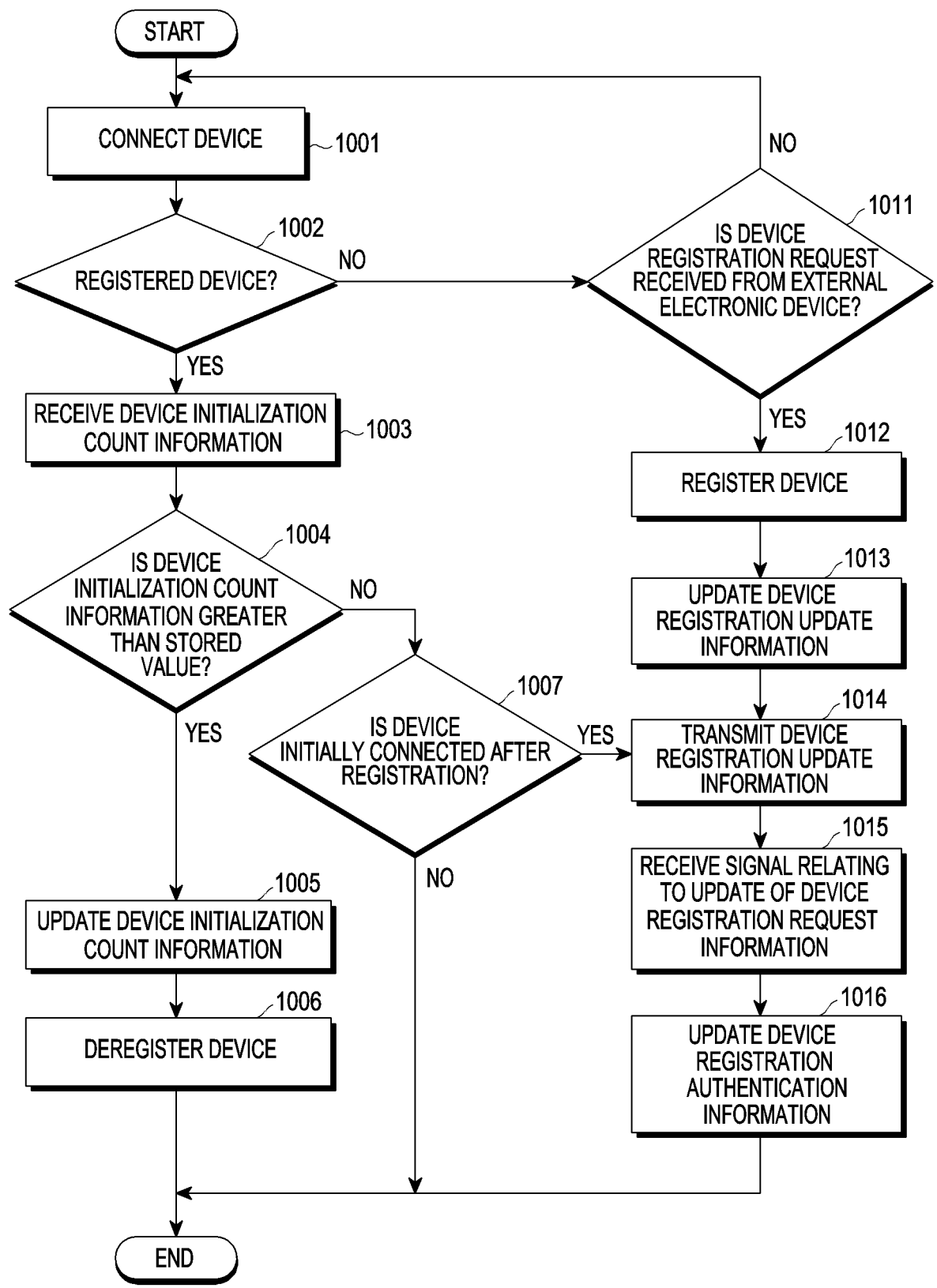
FIG. 10 is a flowchart illustrating an operation performed by a server device according to various embodiments.

FIG. 10 is a flowchart 1000 illustrating an operation performed by a server device according to various embodiments.

According to various embodiments, operation 1001 to operation 1016 may be performed by the server device (e.g., the server 108 of FIG. 1 or the second external electronic device (server device) 208 of FIG. 2) or a processor (e.g., the processor 120 of FIG. 1) included in the server device 108 or 208. The server device 208 may store instructions to execute operation 1001 to operation 1016 in a memory (e.g., the memory 130 of FIG. 1) of the server device 208. In one embodiment, at least one of operation 1001 to operation 1016 may be omitted, some operations thereof may be performed in parallel at the same time, some operations thereof may be performed in a different order, or other operations may be added.

In operation 1001, the server device 208 according to various embodiments may be connected with an electronic device 201 (e.g., an IoT device) via long-range wired or wireless communication through a long-range communication network 199. For example, the electronic device 201 may be a device capable of supporting the long-range communication network 199 and may be a device which stores login information (e.g., device authentication information) enabling connection to the server device 208 in a memory (e.g., the memory 130 of FIG. 1) of the electronic device 201. In this case, the electronic device 201 can be connected to the server device 208 via the long-range wired or wireless communication through the long-range communication network 199 using the login information stored in the memory of the electronic device 201 even before initial device setting or device registration is performed.

In operation 1002, the server device 208 according to various embodiments may determine whether the connected electronic device 201 is a registered device. When the electronic device 201 is a registered device, the server device 208 may perform operation 1003, and when the electronic device 201 is not a registered device, the server device 208 may perform operation 1011.

In operation 1003, the server device 208 according to various embodiments may receive device initialization count information from the connected electronic device 201.

In operation 1004, the server device 208 according to various embodiments may determine whether to deregister the registered electronic device 201 based on the received device initialization count information. For example, the server device 208 may identify whether a device initialization count of the received device initialization count information has a greater value than that of a device initialization count of device initialization count information corresponding to the electronic device 201 stored in the memory of the server device 208. When it is identified that the device initialization count of the received device initialization count information has a greater value, the server device 208 may perform operation 1005, and when it is identified that the device initialization count of the received device initialization count information has the same value, the server device 208 may perform operation 1007. In operation 1007, when the electronic device 201 is not initially connected after device registration, the server device 208 may terminate a method according to this flowchart, and when the electronic device 201 is initially connected after the device registration, the server device 208 may perform operation 1014. For example, when the electronic device 201 is a previously registered device, the server device 208 may provide a function according to the device registration.

In operation 1005, the server device 208 according to various embodiments may update the device initialization count information stored in the memory of the server device 208 to the device initialization count information received from the electronic device 201.

In operation 1006, the server device 208 according to various embodiments may recognize that the electronic device 201 is in a device-initialized state and may initialize (release) the device registration of the electronic device 201.

In operation 1011, the server device 208 according to various embodiments may receive a device registration request of the electronic device 201 from an external electronic device (e.g., the first external electronic device 202 in FIG. 2) (e.g., a mobile device).

In operation 1012, the server device 208 according to various embodiments may perform device registration of the electronic device 201 based on the device registration request of the electronic device 201.

In operation 1013, the server device 208 according to various embodiments may update device registration update information stored in the memory of the server device 208 based on the registration of the electronic device 201.

In operation 1014, when the electronic device 201 is initially connected after the device registration, the server device 208 according to various embodiments may transmit the device registration update information updated based on the registration of the electronic device 201 to the electronic device 201.

In operation 1015, the server device 208 according to various embodiments may receive a signal relating to update of device registration request information from the electronic device 201.

In operation 1016, the server device 208 according to various embodiments may store device registration authentication information corresponding to the electronic device 201 stored in the memory of the server device 208 in synchronization with the device registration update information upon receiving the signal.

Figure 11:
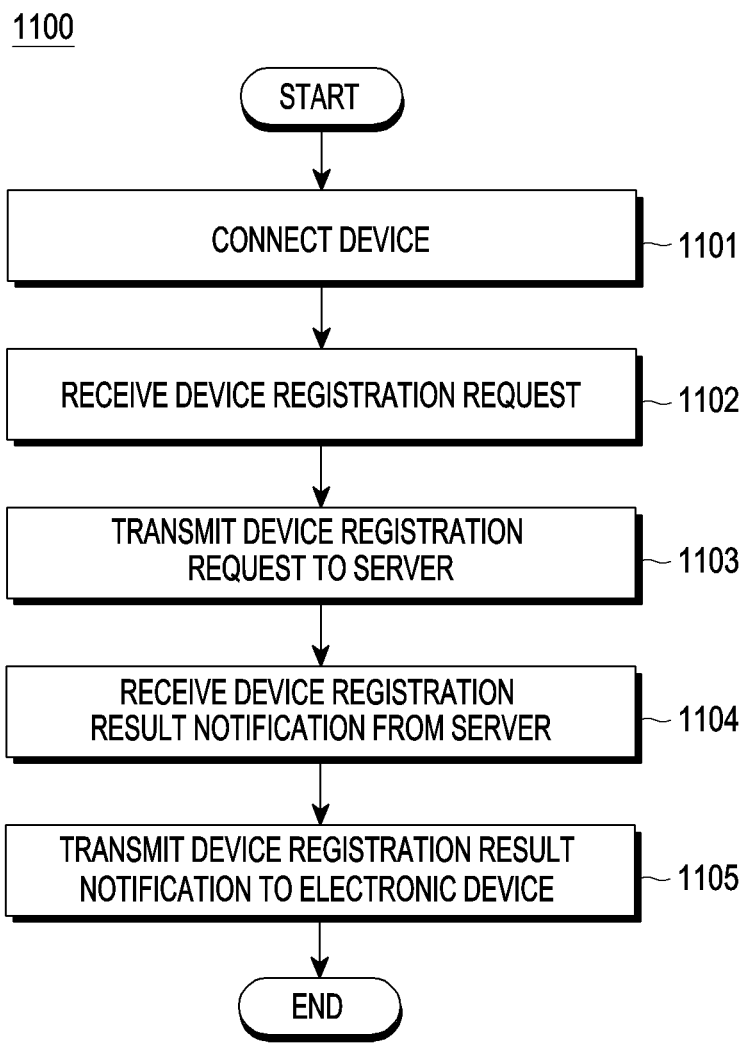
FIG. 11 is a flowchart illustrating an operation performed by an external electronic device according to various embodiments.

FIG. 11 is a flowchart 1100 illustrating an operation performed by an external electronic device according to various embodiments.

According to various embodiments, operation 1101 to operation 1105 may be performed by the external electronic device (e.g., the electronic device 102 or 104 of FIG. 1 or the first external electronic device 202 of FIG. 2, e.g., a mobile device) or a processor (e.g., the processor 120 of FIG. 1) included in the external electronic device 202. The external electronic device 202 may store instructions to execute operation 1101 to operation 1105 in a memory (e.g., the memory 130 of FIG. 1) of the external electronic device 202. In one embodiment, at least one of operation 1101 to operation 1105 may be omitted, some operations thereof may be performed in parallel at the same time, some operations thereof may be performed in a different order, or other operations may be added.

In operation 1101, the external electronic device 202 according to various embodiments may be connected with an electronic device (e.g., the electronic device 201 of FIG. 2) (e.g., an IoT device) via short-range wireless communication through a short-range communication network 198. For example, the external electronic device 202 may automatically or manually connect short-range wireless communication with the electronic device 201 by approaching the electronic device 201. Alternatively, the external electronic device 202 may transmit a connection request to the electronic device 201, and may connect short-range wireless communication when the connection request is accepted by the electronic device 201.

In operation 1102, when the external electronic device 202 is connected with the electronic device 201 via the short-range wireless communication, the external electronic device 202 according to various embodiments may receive a device registration request for device registration from the electronic device 201.

In operation 1103, the external electronic device 202 according to various embodiments may transmit the device registration request received from the electronic device 201 to a server device 208. For example, when the external electronic device 202 is connected to the server device 208, the server device 208 may authenticate a user based on a user account of the external electronic device 202, and when the user is authenticated, the external electronic device 202 may transmit the device registration request of the electronic device 201 to the server device 208.

In operation 1104, the external electronic device 202 according to various embodiments may receive a notification of the result of device registration of the electronic device 201 performed by the server device 208.

In operation 1105, when the result of the device registration is received from the server device 208, the external electronic device 202 may transmit the received result of the device registration to the electronic device 201.

FIG. 12 is a diagram 1200 illustrating a user interface enabling an external electronic device to perform device registration of an electronic device according to various embodiments.

Figures 12A, 12B, 12C, 12D:
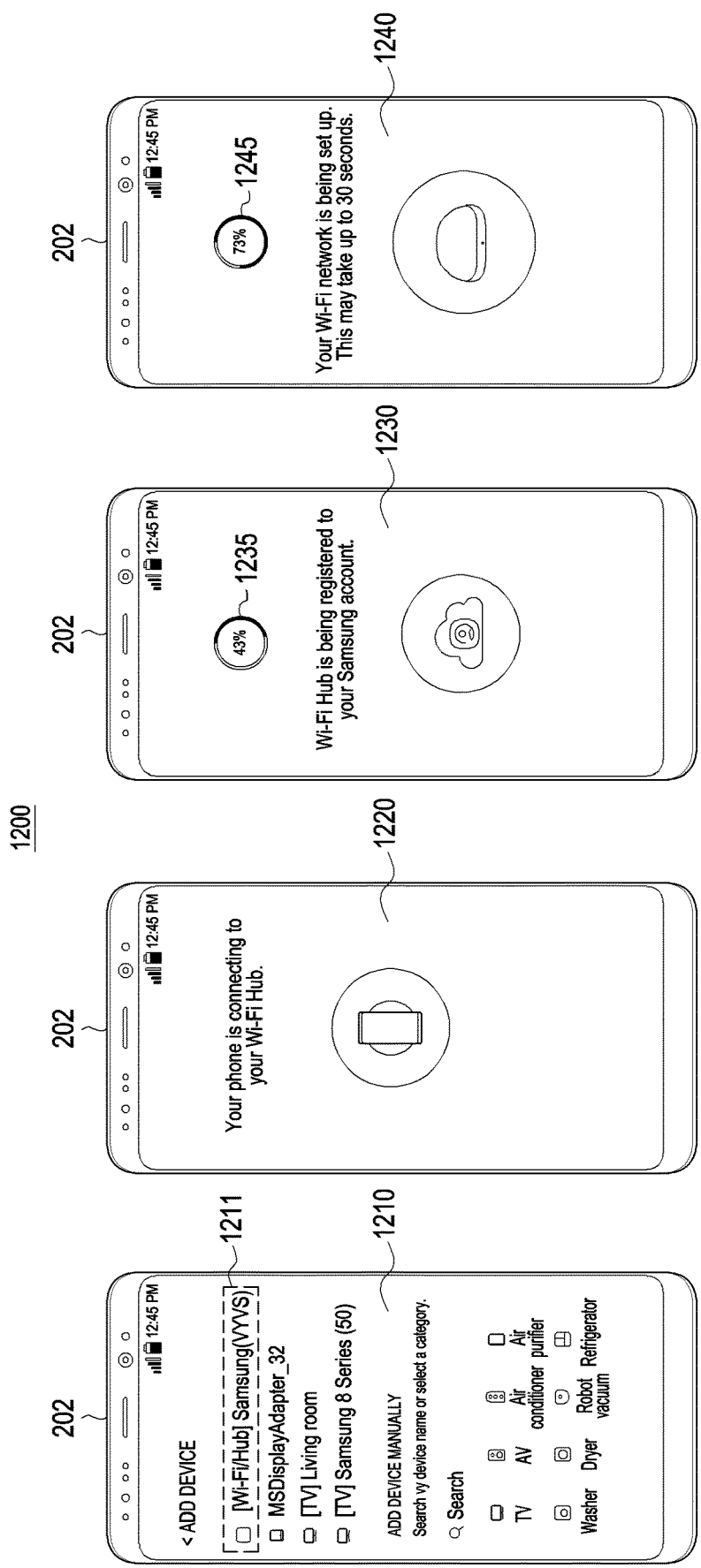
FIG. 12 illustrates a user interface enabling an external electronic device to perform device registration of an electronic device according to various embodiments.

Referring to FIG. 12, the external electronic device 202 according to various embodiments may have an application installed to support a user in registering the electronic device 201 in a server device 208 or may support accessing a website. As illustrated in FIG. 12A, the external electronic device 202 may display a user interface 1210 for adding the electronic device 201 to be registered in the server device 208. In FIG. 12A, the user may select (1211) a router (e.g., a Wi-Fi router).

In FIG. 12B, the external electronic device 202 may display a user interface 1220 indicating a state in which the electronic device 201 (e.g., the router) selected by the user and the external electronic device 202 are connected via short-range wireless communication.

In FIG. 12C, the external electronic device 202 may receive a device registration request for device registration in the server device 208 from the electronic device 201 (e.g., the router) and may display a user interface 1230 indicating a state of transmitting the received device registration request to the server device 208. Further, information 1235 indicating the progress level of a device registration process of the IoT device 201 may be displayed on an upper portion of the user interface 1230.

In FIG. 12D, the external electronic device 202 may transmit the device registration request to the server device 208 and may display a user interface 1240 indicating a state in which device registration of the electronic device 201 is performed and completed by the server device 208. Further, information 1245 indicating the progress level of the device registration process of the electronic device 201 may be displayed on an upper portion of the user interface 1240.

An electronic device (e.g., the electronic device 101 of FIG. 1 or the electronic device 202 of FIG. 2) (e.g., an IoT device) according to various embodiments may include: at least one communication circuit (e.g., the communication module 190 of FIG. 1) configured to provide communication with a first external electronic device (e.g., the electronic device 102 or 104 of FIG. 1 or the first external electronic device 202 of FIG. 2) (e.g., a mobile device) or a second external electronic device (e.g., the server 108 of FIG. 1 or the second external electronic device 208 of FIG. 2) (e.g., a server device); at least one processor (e.g., the processor 120 of FIG. 1) configured to be operatively connected to the at least one communication circuit; and a memory (e.g., the memory 120 of FIG. 1) configured to include device registration request information and to be operatively connected to the at least one processor, wherein the memory 130 may store instructions configured, when executed, to cause the at least one processor 120 to: transmit a device registration request including at least the device registration request information for registering the electronic device 201 in the second external electronic device 208 to the first external electronic device 202 through the at least one communication circuit when first communication (e.g., short-range wireless communication) with the first external electronic device 202 is established; receive a response to the device registration request from the first external electronic device 202; receive device registration update information updated based on the registration request of the electronic device 201 from the second external electronic device 208 through the at least one communication circuit based on the response when second communication (e.g., long-range wired or wireless communication) with the second external electronic device 208 is established; and store the received device registration update information in the memory 130.

In the electronic device 201 according to various embodiments, the instructions may be configured to cause the processor to: identify a state of the electronic device when the first communication is established; and transmit the device registration request to the first external electronic device through the at least one communication circuit based on the identified state of the electronic device.

In the electronic device 201 according to various embodiments, the device registration request may include device identification information for identifying the electronic device.

In the electronic device 201 according to various embodiments, the instructions may be configured to cause the processor to update and store the received device registration update information as the device registration request information in the memory.

In the electronic device 201 according to various embodiments, the instructions may be configured to cause the processor to transmit a signal relating to update of the device registration request information to the second external electronic device through the at least one communication circuit upon updating the device registration request information.

In the electronic device 201 according to various embodiments, the memory may include device initialization count information indicating a device initialization count of the electronic device, and the instructions may be configured to cause the processor to transmit the device initialization count information about the electronic device to the second external electronic device through the at least one communication circuit when the second communication with the second external electronic device is established.

In the electronic device 201 according to various embodiments, the instructions may be configured to cause the processor to update and store the device initialization count information in the memory by increasing the device initialization count when device initialization of the electronic device is detected.

In the electronic device 201 according to various embodiments, the instructions may be configured to cause the processor to transmit the updated device initialization count information to the second external electronic device through the at least one communication circuit upon updating the device initialization count information.

In the electronic device 201 according to various embodiments, the at least one communication circuit may include: at least one first communication circuit configured to provide the first communication with the first external electronic device via a short-range communication network; and at least one second communication circuit configured to provide the second communication with the second external electronic device via a long-range communication network.

An electronic device (e.g., the server 108 of FIG. 1 or the second external electronic device 208 of FIG. 2) (e.g., a server device) according to various embodiments may include: at least one communication circuit (e.g., the communication module 190 of FIG. 1) configured to provide communication with a first external electronic device (e.g., the electronic device 102 or 104 of FIG. 1 or the first external electronic device 202 of FIG. 2) (e.g., a mobile device) or a second external electronic device (e.g., the electronic device 101 of FIG. 1 or the electronic device 201 of FIG. 2) (e.g., an IoT device); at least one processor (e.g., the processor 120 of FIG. 1) configured to be operatively connected to the at least one communication circuit; and a memory (e.g., the memory 130 of FIG. 1) configured to be operatively connected to the at least one processor, wherein the memory 130 may store instructions configured, when executed, to cause the at least one processor 120 to: receive a device registration request including at least device identification information for identifying the second external electronic device 201 and device registration request information for device registration of the second external electronic device 201 from the first external electronic device 202 through the at least one communication circuit; identify device registration authentication information for authenticating device registration of the second external electronic device 201 stored in the memory 130 based on the device registration request; perform device registration of the second external electronic device 201 based on the identified device registration authentication information and the device registration request information included in the device registration request; transmit a result of the device registration of the second external electronic device 201 to the first external electronic device 202; and transmit device registration update information updated based on the registration request of the second external electronic device 201 to the second external electronic device 201 through the at least one communication circuit when the second external electronic device 201 is connected.

In the electronic device 208 according to various embodiments, the instructions may be configured to cause the processor to: authenticate a user based on a user account of the first external electronic device through the at least one communication circuit when the first external electronic device is connected; and receive the device registration request of the second external electronic device from the first external electronic device when the user is authenticated.

In the electronic device 208 according to various embodiments, the instructions may be configured to cause the processor to: identify the device registration update information corresponding to the second external electronic device stored in the memory based on the device identification information about the second external electronic device included in the device registration request; and update and store the device registration update information stored in the memory when the identified device registration update information and the device registration request information included in the device registration request are matched.

In the electronic device 208 according to various embodiments, the instructions may be configured to cause the processor to: identify the device registration update information corresponding to the second external electronic device stored in the memory based on the device identification information about the second external electronic device included in the device registration request; and maintain and store the device registration update information stored in the memory when the identified device registration update information and the device registration request information included in the device registration request are not matched.

In the electronic device 208 according to various embodiments, the instructions may be configured to cause the processor to: identify the device registration authentication information corresponding to the second external electronic device stored in the memory based on the device identification information about the second external electronic device included in the device registration request; and perform the device registration of the second external electronic device when the identified device registration authentication information and the device registration request information included in the device registration request are matched.

In the electronic device 208 according to various embodiments, the instructions may be configured to cause the processor to: receive a signal relating to update of the device registration request information about the second external electronic device from the second external electronic device through the at least one communication circuit; and store the device registration authentication information corresponding to the second external electronic device stored in the memory in synchronization with the device registration update information upon receiving the signal.

In the electronic device 208 according to various embodiments, the memory may include device initialization count information indicating a device initialization count of the second external electronic device, and the instructions may be configured to cause the processor to: receive device initialization count information about the second external electronic device from the second external electronic device through the at least one communication circuit; identify the device initialization count information corresponding to the second external electronic device stored in the memory based on the device identification information about the second external electronic device; and release the device registration of the second external electronic device when the device initialization count of the identified device initialization count information is smaller than a device initialization count of the received device initialization count information.

In the electronic device 208 according to various embodiments, the instructions may be configured to cause the processor to store the device initialization count information corresponding to the second external electronic device stored in the memory in synchronization with the received device initialization count information upon releasing the device registration of the second external electronic device.

In the electronic device 208 according to various embodiments, the at least one communication circuit may be configured to provide communication with the first external electronic device or the second external electronic device through a long-range communication network.

A recording medium according to various embodiments may non-transitorily store instructions which are configured, when executed by at least one circuit, to cause the at least one circuit to perform at least one operation, wherein the at least one operation may include: an operation of transmitting a device registration request including at least a device registration request information for registering the electronic device in a second external electronic device to a first external electronic device when first communication with the first external electronic device is established; an operation of receiving a response to the device registration request from the first external electronic device; an operation of receiving device registration update information updated based on the registration request of the electronic device from the second external electronic device based on the response when second communication with the second external electronic device is established; and an operation of storing the received device registration update information in the memory.

In the recording medium according to various embodiments, the at least one operation may further include: an operation of transmitting device initialization count information indicating a device initialization count of the electronic device to the second external electronic device when the electronic device is connected with the second external electronic device via the second communication; an operation of updating and storing the device initialization count information by increasing the device initialization count when device initialization of the electronic device is detected; and an operation of transmitting the updated device initialization count information to the second external electronic device upon updating the device initialization count information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
   at least one communication circuit configured to provide communication with a first external electronic device or a second external electronic device;
   at least one processor configured to be operatively connected to the at least one communication circuit; and
   a memory configured to comprise device registration request information and to be operatively connected to the electronic device,
   wherein the memory stores instructions configured, when executed, to cause the electronic device to:
   transmit a device registration request comprising at least the device registration request information for registering the electronic device in the second external electronic device to the first external electronic device through the at least one communication circuit when first communication with the first external electronic device is established;
   receive a response to the device registration request from the first external electronic device;
   receive device registration update information updated based on the device registration request of the electronic device from the second external electronic device through the at least one communication circuit based on the response when second communication with the second external electronic device is established; and
   store the received device registration update information in the memory,
   wherein device initialization count information indicating a device initialization count of the electronic device is stored in the memory, and
   wherein the instructions are configured to cause the electronic device to transmit the device initialization count information about the electronic device to the second external electronic device through the at least one communication circuit when the second communication with the second external electronic device is established.

2. The electronic device of claim 1, wherein the instructions are configured to cause the electronic device to:
   identify a state of the electronic device when the first communication is connected; and
   transmit the device registration request to the first external electronic device through the at least one communication circuit based on the identified state of the electronic device.

3. The electronic device of claim 1, wherein the device registration request comprises device identification information for identifying the electronic device.

4. The electronic device of claim 1, wherein the instructions are configured to cause the electronic device to update and store the received device registration update information as the device registration request information in the memory.

5. The electronic device of claim 4, wherein the instructions are configured to cause the electronic device to transmit a signal relating to update of the device registration request information to the second external electronic device through the at least one communication circuit upon updating the device registration request information.

6. The electronic device of claim 1, wherein the instructions are configured to cause the electronic device to:
update and store the device initialization count information in the memory by increasing the device initialization count when device initialization of the electronic device is detected; and
transmit the updated device initialization count information to the second external electronic device through the at least one communication circuit upon updating of the device initialization count information.

7. The electronic device of claim 1, wherein the at least one communication circuit comprises:
at least one first communication circuit configured to provide the first communication with the first external electronic device via a short-range communication network; and
at least one second communication circuit configured to provide the second communication with the second external electronic device via a long-range communication network.

8. An electronic device comprising:
at least one communication circuit configured to provide communication with a first external electronic device or a second external electronic device;
at least one processor configured to be operatively connected to the at least one communication circuit; and
a memory configured to be operatively connected to the electronic device,
wherein the memory stores instructions configured, when executed, to cause the electronic device to:
receive a device registration request comprising at least device identification information for identifying the second external electronic device and device registration request information for device registration of the second external electronic device from the first external electronic device through the at least one communication circuit;
identify device registration authentication information for authenticating device registration of the second external electronic device stored in the memory based on the device registration request;
perform device registration of the second external electronic device based on the identified device registration authentication information and the device registration request information comprised in the device registration request;
transmit a result of the device registration of the second external electronic device to the first external electronic device; and
transmit device registration update information updated based on the device registration request of the second external electronic device to the second external electronic device through the at least one communication circuit when the second external electronic device is connected,
wherein device initialization count information indicating a device initialization count of the second external electronic device is stored in the memory, and wherein the instructions are configured to cause the electronic device to receive the device initialization count information about the second external electronic device from the second external electronic device through the at least one communication circuit.

9. The electronic device of claim 8, wherein the instructions are configured to cause the electronic device to:
authenticate a user based on a user account of the first external electronic device through the at least one communication circuit when the first external electronic device is connected; and
receive the device registration request of the second external electronic device from the first external electronic device when the user is authenticated.

10. The electronic device of claim 8, wherein the instructions are configured to cause the electronic device to:
identify the device registration update information corresponding to the second external electronic device stored in the memory based on the device identification information about the second external electronic device comprised in the device registration request;
update and store the device registration update information stored in the memory when the identified device registration update information and the device registration request information comprised in the device registration request are matched; and
maintain and store the device registration update information stored in the memory when the identified device registration update information and the device registration request information comprised in the device registration request are not matched.

11. The electronic device of claim 8, wherein the instructions are configured to cause the electronic device to:
identify the device registration authentication information corresponding to the second external electronic device stored in the memory based on the device identification information about the second external electronic device comprised in the device registration request; and
perform the device registration of the second external electronic device when the identified device registration authentication information and the device registration request information comprised in the device registration request are matched.

12. The electronic device of claim 8, wherein the instructions are configured to cause the electronic device to:
receive a signal relating to update of the device registration request information about the second external electronic device from the second external electronic device through the at least one communication circuit; and
store the device registration authentication information corresponding to the second external electronic device stored in the memory in synchronization with the device registration update information upon receiving the signal.

13. The electronic device of claim 8, wherein
the instructions are configured to cause the electronic device to:
identify the device initialization count information corresponding to the second external electronic device stored in the memory based on the device identification information about the second external electronic device;
release the device registration of the second external electronic device when the device initialization count of the identified device initialization count information is smaller than a device initialization count of the received device initialization count information; and store the device initialization count information corresponding to the second external electronic device stored in the memory in synchronization with the received device initialization count information upon releasing the device registration of the second external electronic device.

14. A non-transitory recording medium non-transitorily storing instructions which are configured, when executed by at least one circuit of an electronic device, to cause the electronic device to perform at least one operation comprising:

an operation of transmitting a device registration request comprising at least a device registration request information for registering the electronic device in a second external electronic device to a first external electronic device when the electronic device is connected with the first external electronic device via first communication;

an operation of receiving a response to the device registration request from the first external electronic device;

an operation of receiving device registration update information updated based on the device registration request of the electronic device from the second external electronic device based on the response when second communication with the second external electronic device is established;

an operation of storing the received device registration update information; and an operation of transmitting device initialization count information indicating a device initialization count of the electronic device to the second external electronic device through at least one communication circuit when the second communication with the second external electronic device is established, wherein the device initialization count information indicating the device initialization count of the electronic device is stored in a memory of the electronic device.

* * * * *